United States Patent
Camozzi et al.

(10) Patent No.: US 12,162,452 B2
(45) Date of Patent: Dec. 10, 2024

(54) METHOD AND SYSTEM FOR DETERMINING A BRAKING TORQUE, BY MEANS OF DETECTION PERFORMED BY PHOTONIC SENSORS AT A FIXING INTERFACE BETWEEN A BRAKE CALIPER BODY AND A RESPECTIVE SUPPORT

(71) Applicants: BREMBO S.p.A., Curno (IT);
SCUOLA SUPERIORE DI STUDI UNIVERSITARI E DI PERFEZIONAMENTO SANT'ANNA, Pisa (IT)

(72) Inventors: Francesco Camozzi, Curno (IT); Fabio Meldini, Curno (IT); Tiziano Nannipieri, Curno (IT); Alessandro Signorini, Curno (IT); Massimiliano Solazzi, Curno (IT); Massimiliano Gabardi, Curno (IT)

(73) Assignee: Brembo S.p.A, Curno (IT)

( * ) Notice: Subject to any disclaimer, the term of this patent is extended or adjusted under 35 U.S.C. 154(b) by 279 days.

(21) Appl. No.: 17/618,701

(22) PCT Filed: Jun. 12, 2020

(86) PCT No.: PCT/IB2020/055541
§ 371 (c)(1),
(2) Date: Dec. 13, 2021

(87) PCT Pub. No.: WO2020/250199
PCT Pub. Date: Dec. 17, 2020

(65) Prior Publication Data
US 2022/0242383 A1 Aug. 4, 2022

(30) Foreign Application Priority Data
Jun. 13, 2019 (IT) .................. 102019000008898

(51) Int. Cl.
*B60T 17/22* (2006.01)
*F16D 65/00* (2006.01)
(Continued)

(52) U.S. Cl.
CPC .......... *B60T 17/22* (2013.01); *F16D 65/0056* (2013.01); *F16D 66/00* (2013.01);
(Continued)

(58) Field of Classification Search
CPC ... B60T 17/22; G01L 5/16; G01L 5/22; F16D 65/09
See application file for complete search history.

(56) References Cited

U.S. PATENT DOCUMENTS

| | | | | |
|---|---|---|---|---|
| 4,660,684 A | * | 4/1987 | Carre | F16D 65/567 188/71.9 |
| 5,973,317 A | * | 10/1999 | Hay | G01L 5/243 385/12 |

(Continued)

FOREIGN PATENT DOCUMENTS

| | | |
|---|---|---|
| DE | 102012007118 A1 | 10/2013 |
| DE | 102013008185 A1 | 11/2014 |

(Continued)

OTHER PUBLICATIONS

European Patent Office, International Search Report with Written Opinion, issued in PCT/IB2020/055541, Sep. 24, 2020, 13 pages, European Patent Office, Rijswijk, Netherlands.

*Primary Examiner* — Tan Q Nguyen
(74) *Attorney, Agent, or Firm* — Marshall & Melhorn, LLC

(57) ABSTRACT

A method for determining a braking torque at at least one fixing interface between a brake caliper body and a brake caliper support includes inserting at least one washer device at the at least one fixing interface, the washer device having
(Continued)

at least one fiber-optic strain sensor of fiber Bragg grating type, detecting, by the at least one fiber-optic strain sensor, local deformation and/or strain acting in a respective detecting position, and generating at least one respective photonic signal representative of the detected deformation and/or strain, receiving the at least one first photonic signal, by an optical reading/interrogation unit optically connected to the at least one fiber-optic strain sensor, generating at least one electric signal representative of the detected local deformation and/or strain, based on the received first photonic signal, and determining the braking torque based on the at least one electrical signal.

31 Claims, 12 Drawing Sheets

(51) Int. Cl.
| | | |
|---|---|---|
| F16D 66/00 | (2006.01) | |
| G01L 1/24 | (2006.01) | |
| G01L 5/00 | (2006.01) | |
| G01L 5/28 | (2006.01) | |
| F16D 55/00 | (2006.01) | |
| G01L 5/16 | (2020.01) | |

(52) U.S. Cl.
CPC ............ *G01L 1/242* (2013.01); *G01L 5/0042* (2013.01); *G01L 5/28* (2013.01); *F16D 2055/0008* (2013.01); *F16D 2066/005* (2013.01); *F16D 2066/006* (2013.01); *F16D 2250/0084* (2013.01)

(56) References Cited

U.S. PATENT DOCUMENTS

| | | | |
|---|---|---|---|
| 8,672,539 | B2 | 3/2014 | Skinner |
| 2005/0029056 | A1 | 2/2005 | Baumgartner et al. |
| 2007/0228815 | A1 | 10/2007 | Horiuchi et al. |
| 2009/0310642 | A1 | 12/2009 | Skinner |
| 2017/0370433 | A1* | 12/2017 | Chelaidite .............. F16D 67/02 |
| 2021/0324929 | A1* | 10/2021 | Zhang ................. F16D 65/0075 |

FOREIGN PATENT DOCUMENTS

| | | |
|---|---|---|
| DE | 102017211739 A1 | 3/2018 |
| DE | 102017211741 A1 | 3/2018 |
| WO | WO03/029682 A1 | 4/2003 |
| WO | WO03/076887 A1 | 9/2003 |

* cited by examiner

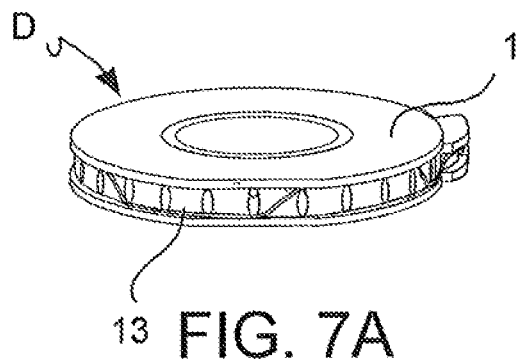
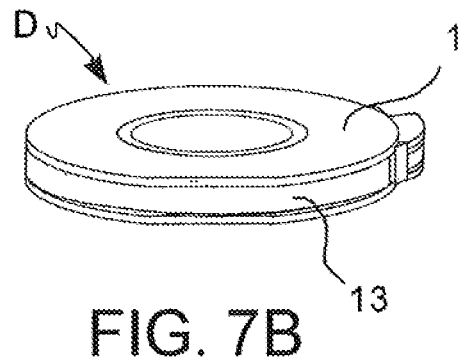
FIG. 7A  FIG. 7B
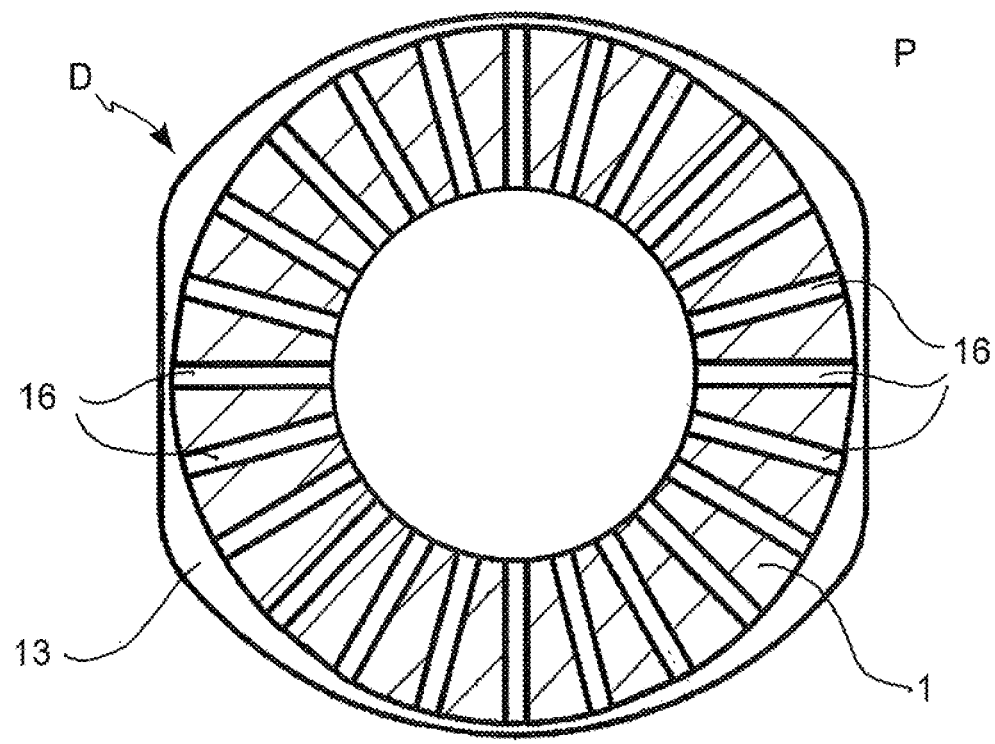
FIG. 8A

METHOD AND SYSTEM FOR DETERMINING A BRAKING TORQUE, BY MEANS OF DETECTION PERFORMED BY PHOTONIC SENSORS AT A FIXING INTERFACE BETWEEN A BRAKE CALIPER BODY AND A RESPECTIVE SUPPORT

CROSS-REFERENCE TO RELATED APPLICATIONS

This application is a National Phase Application of PCT International Application No. PCT/IB2020/055541, having an International Filing Date of Jun. 12, 2020 which claims priority to Italian Application No. 102019000008898 filed Jun. 13, 2019, each of which is hereby incorporated by reference in its entirety.

FIELD OF THE INVENTION

The present invention relates to a method and a system for determining a braking torque by detection made with photonic sensors (i.e., fiber-optic sensors) at a fixing interface between a brake caliper body and a respective support.

The present invention further relates to a sensorized brake caliper equipped to allow the aforesaid method to be implemented.

BACKGROUND ART

For controlling, monitoring and actuating a braking system, e.g., an electronically controlled disc brake system, it is very useful to know the force or braking torque value applied by the brake calipers of the braking system during a braking action in real-time and as precisely as possible.

However, it is difficult to measure the braking force and/or torque applied by the brake calipers of the brake system directly, accurately, and reliably.

In this regard, there is a tendency in the known art to determine the braking torque and/or braking force based on measurements which are indirect but refer to quantities closely related to the braking torque and/or force, e.g., forces acting at different points of the brake caliper.

On the other hand, an additional need must be taken into account, i.e., the need to use sensor devices which are as miniaturized and compact as possible, so that they can be easily integrated into the braking system without causing functional problems.

Some compact sensor devices, capable of detecting and/or measuring the lateral (shear) forces acting between the brake caliper support and the hub of the vehicle using strain sensors, are known in this regard.

However, such known devices can determine the braking force and/or torque, based on the measurement of lateral forces that are carried out, with poor accuracy and over a relatively limited range of measurable forces.

Furthermore, the result provided by such devices is not completely independent from the tightening torque of the screw used to secure the two components between which the forces are measured. In other words, the result is not independent of axial forces, which constitute a disturbance with respect to the accuracy of the estimate of the braking force and/or torque.

In light of the above, the need is strongly felt for devices and methods for determining the braking torque and/or force more accurately by means of indirect measurements performed at the interface between brake caliper body and brake caliper support, or between brake caliper support and hub.

For this application, additional requirements for the measuring device are compactness, robustness, ease of installation (e.g., using the fixing systems already provided for fixing the brake caliper), and versatility of use in the context of fixed or floating caliper disc brakes.

As noted above, the requirements mentioned above are not fully met by the solutions currently available from the prior art.

SOLUTION

It is the object of the present invention to provide a method for determining a braking torque by means of detection performed by photonic sensors at a fixing interface between a brake caliper body and respective support, which allows solving, at least in part, the drawbacks described above with reference to the prior art and to respond to the aforementioned needs particularly felt in the considered technical sector.

This and other objects are achieved by a method for detecting a braking torque as described and claimed herein.

It is a further purpose of the present invention to provide a corresponding system for determining a braking torque by a detection performed by photonic sensors at a fixing interface between a brake caliper body and a respective support.

This object is achieved by a system as described and claimed herein.

It is a further object of the present invention to provide a washer device for deformation and/or strain detection, comprised in the aforesaid system and usable in the aforesaid mentioned method.

These and other objects are achieved by a washer device as described and claimed herein.

It is a further object of the present invention to provide a sensorized brake caliper for a vehicle braking system, equipped so as to allow performing the aforesaid method.

These and other objects are achieved by a sensorized brake caliper as described and claimed herein.

It is a further object of the present invention to provide a braking system using at least one of the aforesaid sensorized brake calipers or the aforesaid system for determining a braking torque.

Finally, it is the object of the present invention to provide a manufacturing method of a washer device for deformation and/or strain detection.

These and other objects are achieved by a manufacturing method as described and claimed herein.

BRIEF DESCRIPTION OF THE DRAWINGS

Further features and advantages of the method and systems according to the invention will be apparent from the following description of its preferred embodiments, given by way of non-limiting examples, with reference to the accompanying figures, in which:

FIGS. 4, 5, 6, 7A and 7B show perspective, side and orthogonal views of a washer device containing strain sensors, according to some embodiments comprised in the invention;

FIGS. 8A, 8B, 8C show section views of three embodiments of a washer device containing strain sensors, comprised in the invention;

DETAILED DESCRIPTION OF THE INVENTION

Figure 1:
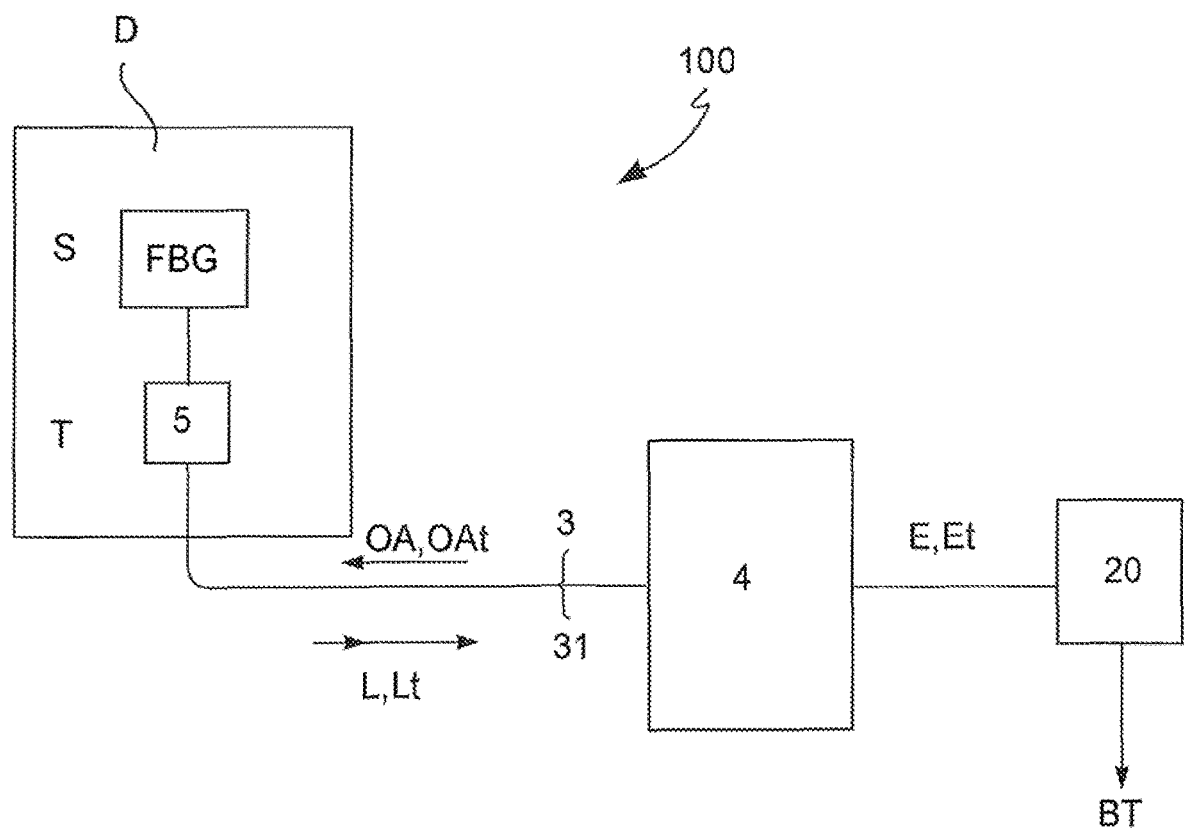
FIG. 1, 2A, 2B, 3A, 3B illustrate, by means of functional block diagrams, respective different embodiments of a sensorized brake caliper for detecting a braking force, according to the present invention.

With reference to FIGS. 1-14, a method for determining a braking torque BT resulting from the actuation of a vehicle braking system, by means of a detection performed at at least one fixing interface (i, ii, iii, iv) between a brake caliper body 60 and a respective support 61 (or, in another possible application, between an axle and a suspension of a wheel) is described.

The method firstly comprises the step of inserting at least one washer device D at the aforesaid at least one fixing interface (i, ii, iii, iv), so that the washer device D is fixed and pressed between the brake caliper body 60 and the brake caliper support 61, or between the brake caliper support 61 and a head of a clamping element 63, 64, or between the axle and the wheel suspension.

The washer device D is subject to deformation when exposed to forces, so that the deformation and/or force S locally present at each point of the washer device D is representative of the forces acting at the at least one fixing interface, dependent on the braking torque BT.

The aforesaid washer device D incorporates at least one deformation and/or strain sensor (FBG), at a respective detecting position, arranged to detect a deformation and/or strain representative of the three spatial vector components of the force acting on the washer device D at the detecting position.

The at least one deformation and/or strain sensor (FBG) is a fiber-optic strain sensor FBG of the fiber Bragg grating type.

The method then comprises the step of detecting, by means of each of the at least one fiber-optic strain sensor FBG, the local deformation and/or strain S acting in the respective detecting position, and generating a respective at least one photonic signal L representative of the detected deformation and/or strain S.

Therefore, the method provides receiving the aforesaid at least one photonic signal L, by an optical reading/interrogation unit 4, optically connected to the aforesaid at least one fiber-optic strain sensor 2, and to generate, by the optical reading/interrogation unit 4, at least one first electrical signal E representative of the detected local deformation and/or strain S, based on the aforesaid at least one received photonic signal L.

Finally, the method comprises the step of determining the braking torque BT based on the aforesaid at least one electrical signal E representative of the deformation and/or strain S.

According to an embodiment of the method, the step of inserting comprises inserting a plurality of washer devices D1, D2, D3, D4, each at a respective fixing interface (i, ii, iii, iv), and each of such washer devices incorporates a plurality of deformation and/or strain sensors (FBG1, FBG2, FBG3, FBG4, FBG5, FBG6).

In this case, the step of determining comprises determining the braking torque BT based on a plurality of electrical signals $E_{jk}$, each deriving from a respective photonic signal $L_{jk}$ representative of a respective deformation and/or strain $S_{ij}$, detected by a respective fiber-optic strain sensor. In the aforesaid notations, j is an index indicating one of the plurality of washer devices and k is an index indicating one of the plurality of fiber-optic strain sensors comprised in the washer device.

In different implementation options, any number of washer devices D can be used.

In several implementation options, each washer device D may comprise any number of fiber-optic strain sensors FBG.

According to a preferred implementation option of the method, the step of determining comprises: inserting a first washer device D1 at a first fixing interface (i) between the head of a first fixing bolt 63 and a first portion of the caliper support 61; inserting a second washer device D2 at a first fixing interface (ii) between the head of a second fixing bolt 64 and a second portion of the caliper support 61; inserting a third washer device D3 at a third fixing interface (iii) between a third portion of the caliper support 61 and the caliper body 60; inserting a fourth washer device D4 at a fourth fixing interface (iv) between a fourth portion of the caliper support 61 and the caliper body 60.

According to different implementation options, the method can provide for any combination of one, two, three or four of the aforesaid washer devices, each in the respective manner shown above.

According to an embodiment of the method, the one or more fiber-optic strain sensors FBG are comprised in an optical fiber 14 arranged within a tangentially peripheral band 13 of the washer device D. Furthermore, each of the aforesaid fiber-optic strain sensors FBG is obtained in a respective portion of optical fiber inclined with respect to a radial plane of the washer (p) at an acute or obtuse inclination angle different from each of the values 0°, 90°, 180° and 270°, to detect a strain S in a direction different from a normal direction and from a tangential direction, with respect to the washer, so that the detected strain S depends both on the normal component and on the tangential component of the force acting on the sensor.

According to a preferred embodiment, the method comprises the further steps of incorporating at least one respective fiber-optic temperature sensor 5 of the fiber Bragg grating type in the at least one washer device D; then, detecting, by means of at least one temperature sensor 5, a temperature value T present in the respective position and generating a respective at least one auxiliary photonic signal Lt representative of the measured temperature value T; then, receiving the at least one auxiliary generated photonic signal Lt, by the optical reading/implementation unit 4, optically connected to the at least one temperature sensor 5; and generating, by the optical reading/implementation unit 4, at least one auxiliary electrical signal Et representative of the temperature, based on said at least one auxiliary received photonic signal Lt.

In this case, the step of determining comprises processing the aforesaid at least one first electrical signal E and at least one electrical signal Et to obtain a measurement of the braking torque BT taking a temperature compensation into account.

The aforesaid Fiber-Bragg-Grating optical sensors (hereinafter also referred to as "FBG sensors") are deformation and/or strain sensors of a type known in itself.

It is known that an FBG sensor is a very sensitive and versatile optical device for measuring various physical parameters, including strain and temperature. In its simplest form, an FBG sensor is obtained by means of a spatially periodic modulation of the refractive index inscribed in the core of the optical fiber (which can be obtained, for example, through the phenomenon of photo-sensitivity or using femtosecond light pulses).

The FBG sensors exploit the presence of a resonant condition which reflects the incident light at the so-called "Bragg wavelength" $\lambda_B$, defined as $\lambda_B = 2n_{eff}/\Lambda$, where $n_{eff}$ is the effective refractive index of the fundamental mode of the optical fiber and $\Lambda$ is the spatial pitch (periodicity) of the grating.

The operating principle of FBG sensors is based on the property that any change in the effective refractive index or grating pitch, caused by external effects, such as strain or temperature, results in a respective shift $\Delta\lambda_B$ of the operating wavelength (Bragg wavelength) which can be derived from formula [1]:

$$\frac{\Delta\lambda_B}{\lambda_B} = k\varepsilon + \alpha_T \Delta T$$

where $\Delta\lambda_B = \lambda - \lambda_B$ is the Bragg wavelength variation with respect to the reference Bragg wavelength $\lambda_B$, k is a scale factor and $\alpha_T$ is the thermo-optical coefficient; the Bragg wavelength shift is linearly dependent on the longitudinal strain $\varepsilon$ with a sensitivity value of about 1.2 pm/µε and temperature change with a sensitivity value of about 11 pm/° C. for silicon fibers in the range of 1550 nm.

According to an implementation option, the aforesaid at least one temperature sensor 5 comprises a fiber Bragg grating made in the same optical fiber 14 wherein the at least one deformation and/or strain sensor FBG is made.

The FBG sensors are "passive" sensors, meaning that they do not need to be powered, but are activated by illumination, i.e., by sending optical activation radiation, at an appropriate wavelength (e.g., the Bragg wavelength), in the fiber optic section in which the grating is contained. In response to this, the FBG sensor either reflects or transmits an optical (i.e., photonic) signal, which depends not only on the incident radiation but also on the strain conditions to which the grating itself is subjected. Such photonic signal can be, in different implementation options of the method which will be shown below, a transmitted optical signal (or optical spectrum) or a reflected optical signal (or optical spectrum).

According to an embodiment of the method (diagrammatically illustrated in FIG. 1), the fiber-optic strain sensor FBG is connected to the optical reading/interrogation unit 4 by means of a first connection optical fiber 31. Furthermore, the optical reading/interrogation unit 4 is configured to activate the aforesaid fiber-optic strain sensor FBG by transmitting an optical activation radiation OA through the aforesaid first connection optical fiber 31. Furthermore, the aforesaid photonic signal L comprises a first optical spectrum L reflected by the strain sensor FBG of the fiber Bragg grating type, which reaches the optical reading/interrogation unit 4 through said first connection optical fiber 31.

According to another embodiment of the method (diagrammatically illustrated in FIG. 2A), the fiber-optic strain sensor FBG is connected to the optical reading/interrogation unit 4 by means of a first input connection optical fiber 32 and a second output connection optical fiber 33. Furthermore, the optical reading/interrogation unit 4 is configured to activate the aforesaid fiber-optic strain sensor 2 by transmitting an optical activating radiation OA through the first input connection optical fiber 32. Furthermore, the aforesaid photonic signal L comprises an optical spectrum L transmitted by the fiber Bragg grating type strain sensor FBG, which reaches the optical reading/interrogation unit 4 through the second connection optical fiber 33.

According to an implementation option, each connection between each fiber in which the fiber Bragg grating type sensors are obtained and a respective connection optical fiber to the optical reading/interrogation unit is made by means of a fiber splice or a detachable photonic connection element (optical connector).

According to an embodiment of the method, a plurality of fiber-optic strain sensors FBG is provided and advantageously used.

In such an embodiment (shown in FIGS. 2A and 2B), each of the fiber-optic strain sensors (FBG1, FBG2, FBG3, FBG4, FBG5, FBG6) of a device is made by means of a respective Bragg grating, associated with a respective central operating wavelength ($\lambda 1$, $\lambda 2$, $\lambda 3$, $\lambda 4$, $\lambda 5$, $\lambda 6$).

In this case, the step of generating a respective at least one photonic signal comprises generating a plurality of respective photonic signals (L1, L2, L3, L4, L5, L6); the step of receiving comprises receiving the aforesaid plurality of photonic signals (L1, L2, L3, L4, L5, L6) by the optical reading/interrogation unit 4; the step of generating at least one first electrical signal E comprises generating a respective plurality of electrical signals (E1, E2, E3, E4, E5, E6), based on the plurality of received photonic signals (L1, L2, L3, L4, L5, L6); the step of processing comprises processing the plurality of electrical signals (E1, E2, E3, E4, E5, E6) to obtain a measurement of the braking torque BT.

Figure 2A:
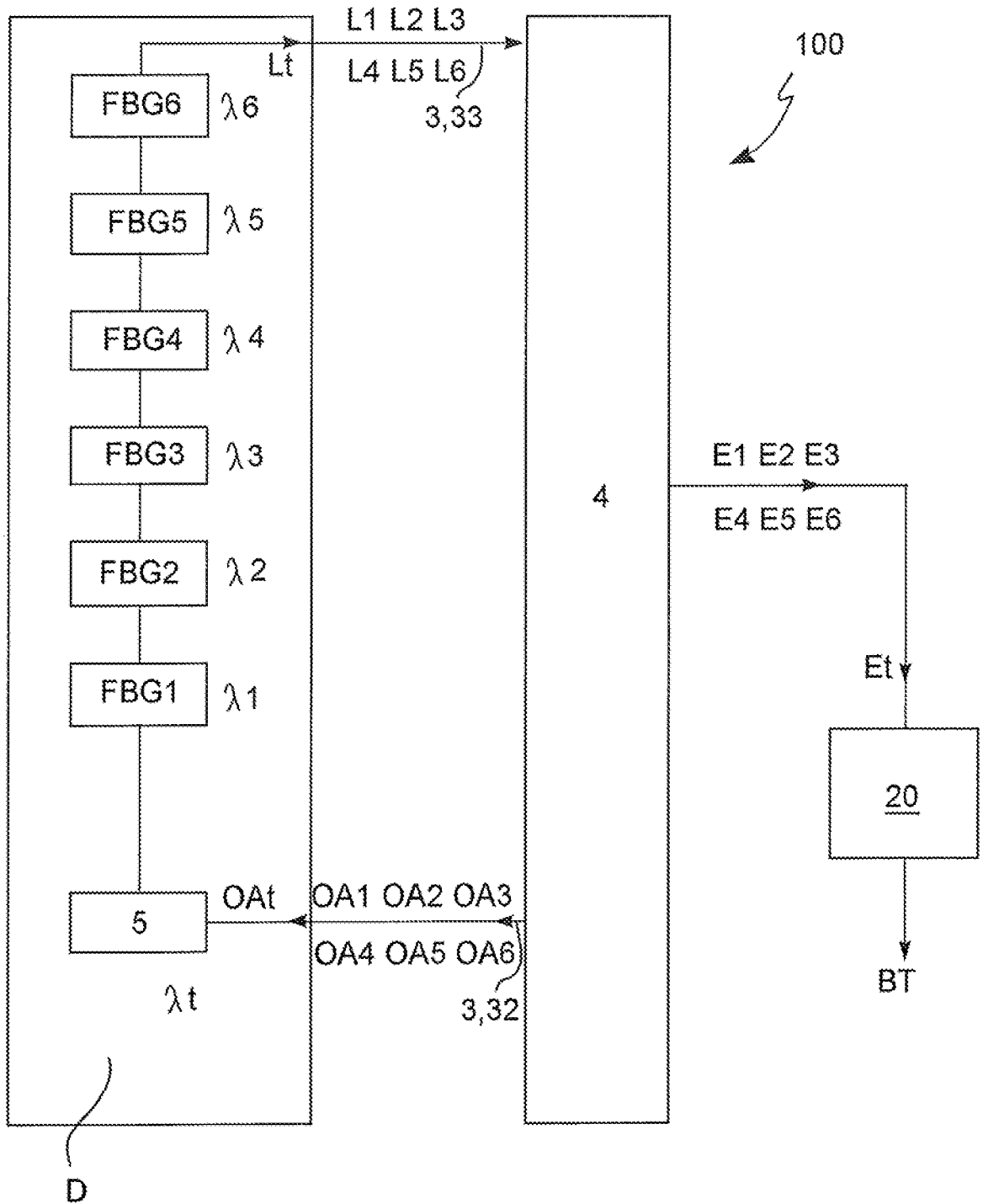
Figure 2B:
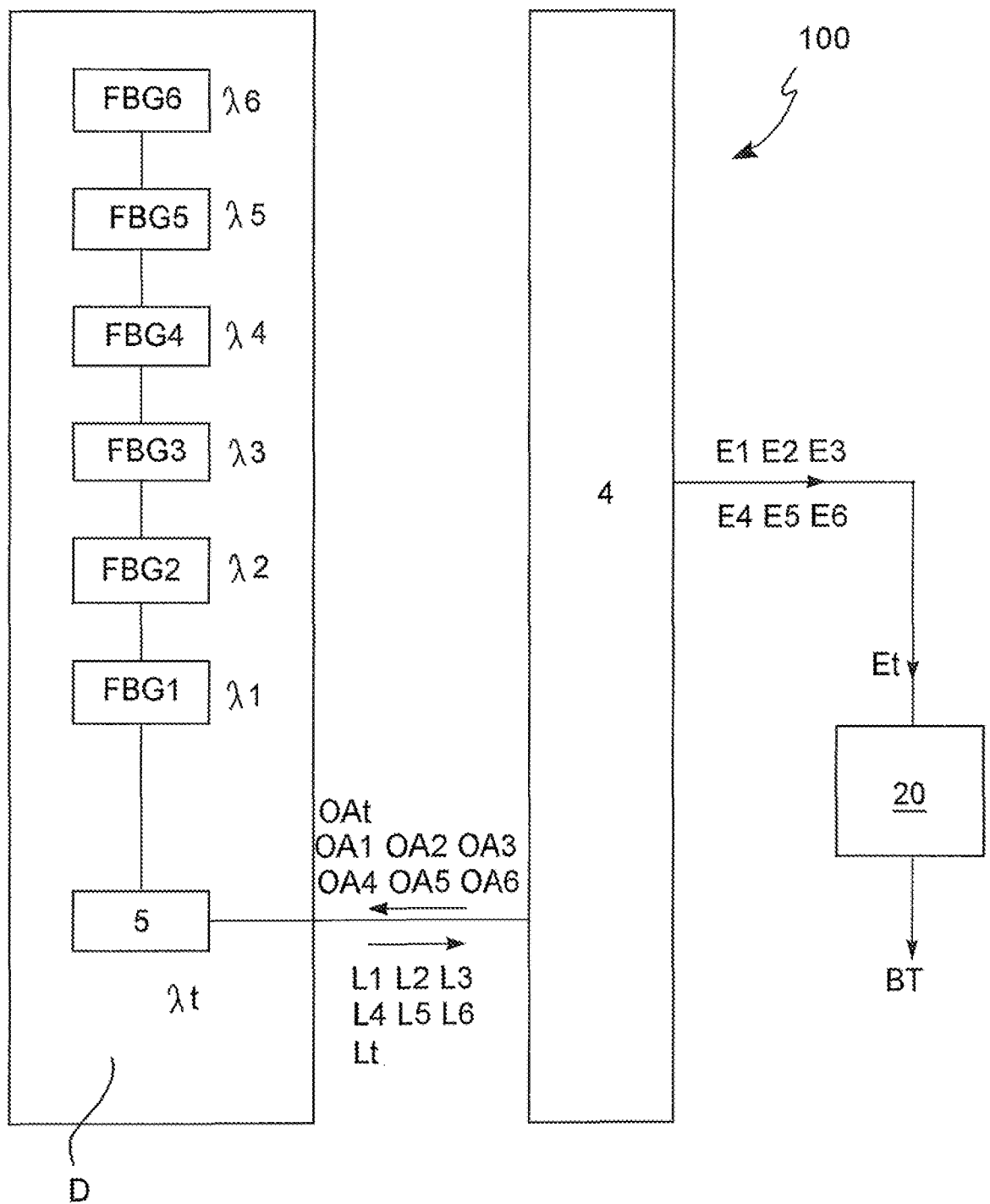
Figure 3A:
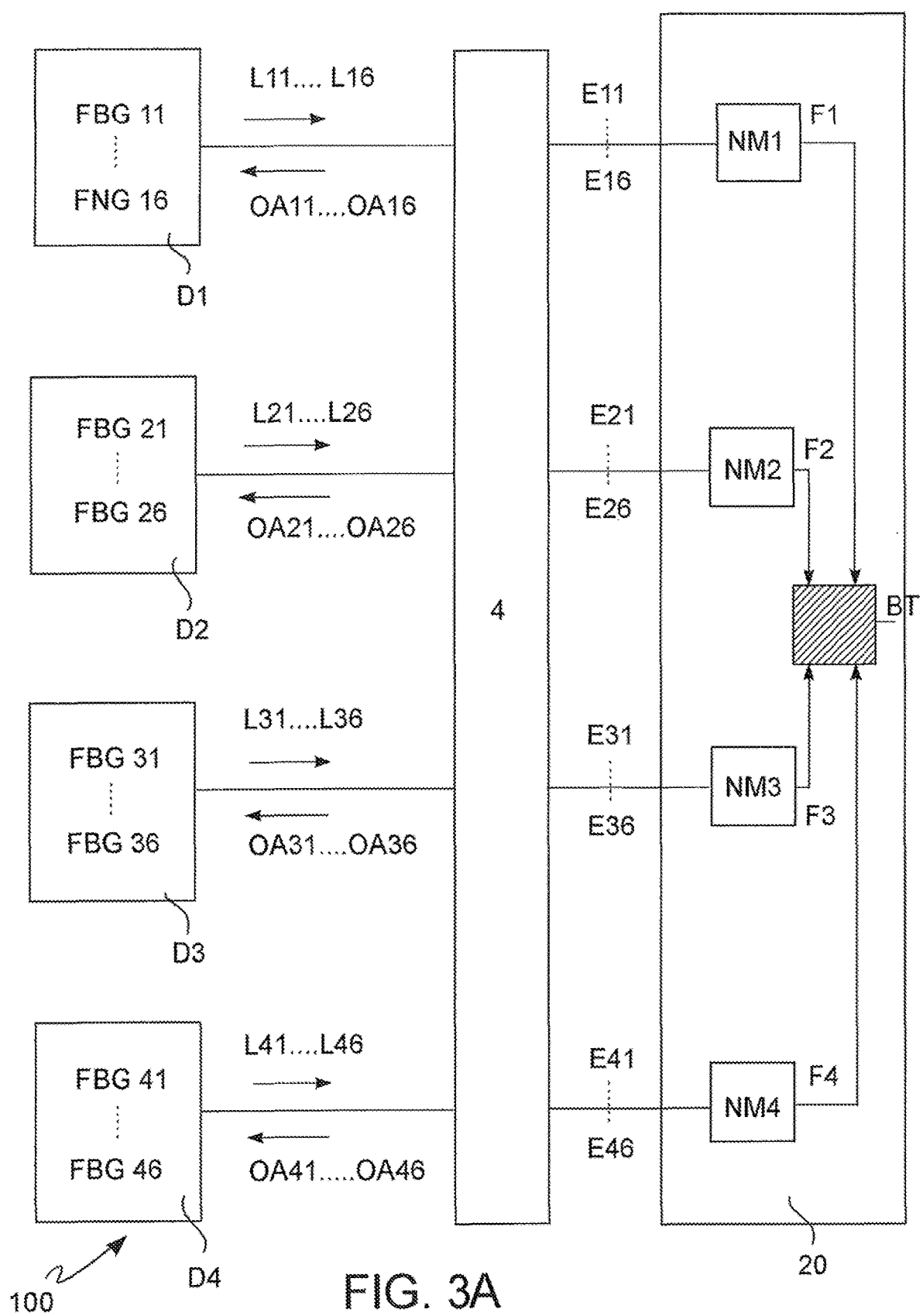
Figure 3B:
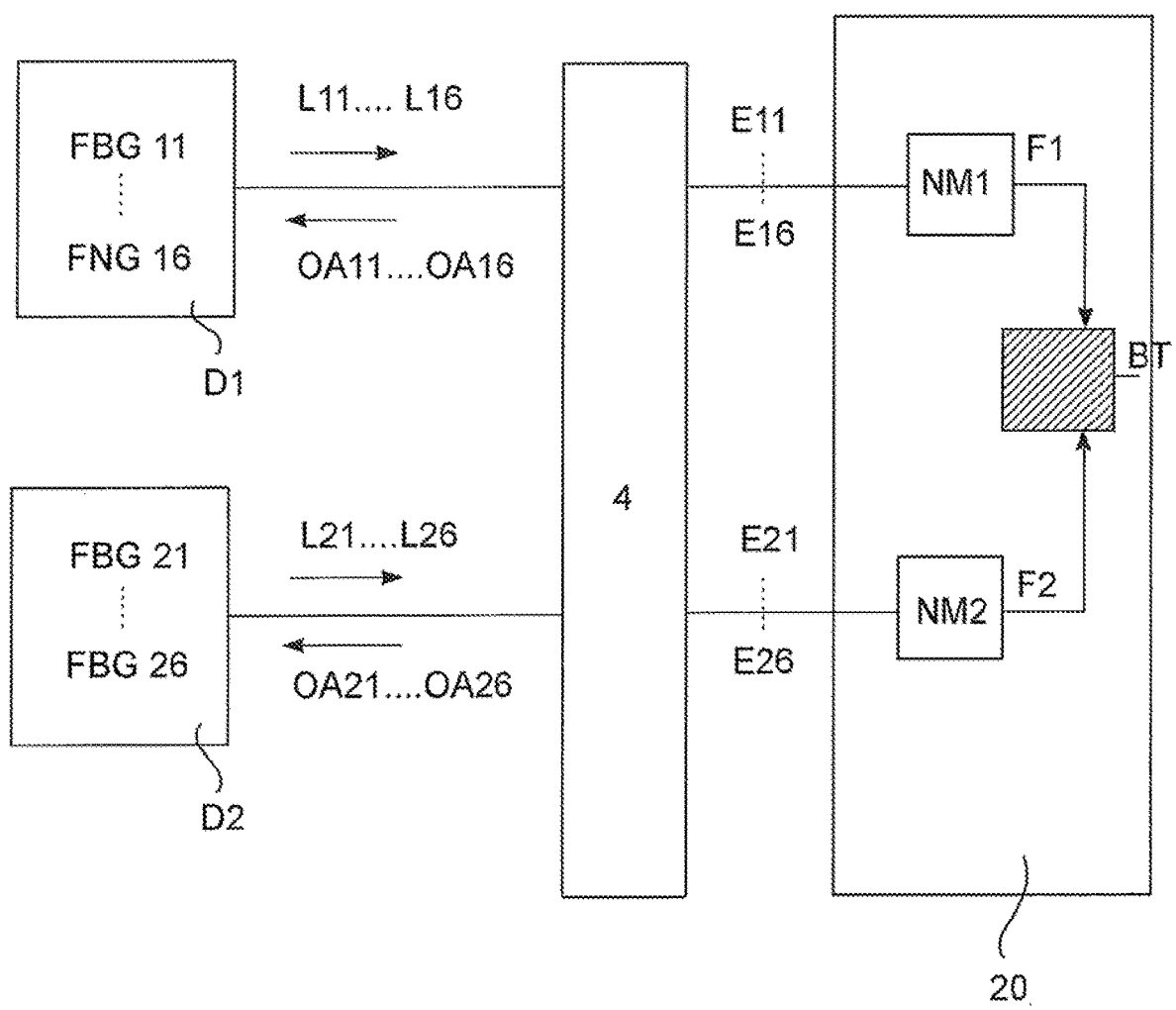
Figure 4:
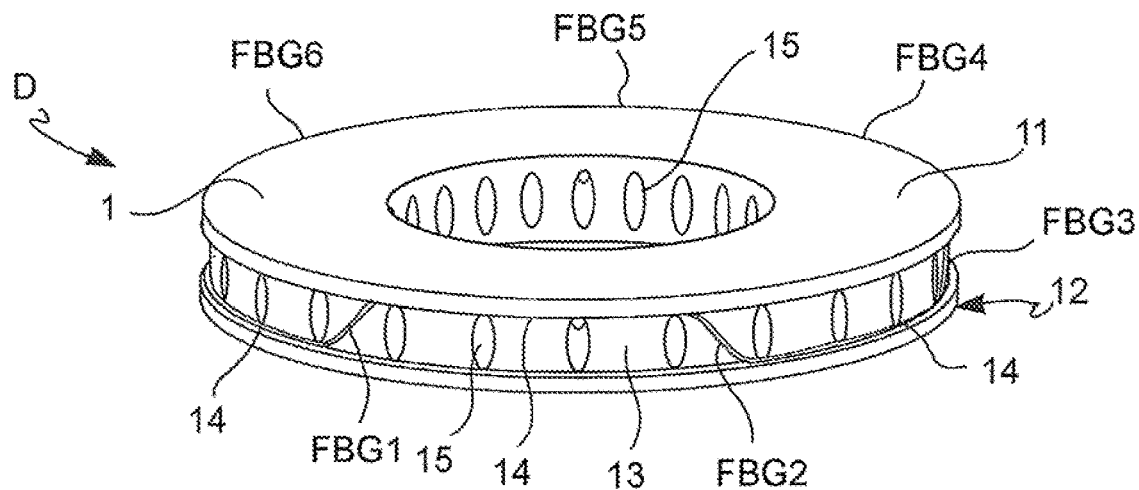
Figure 5:
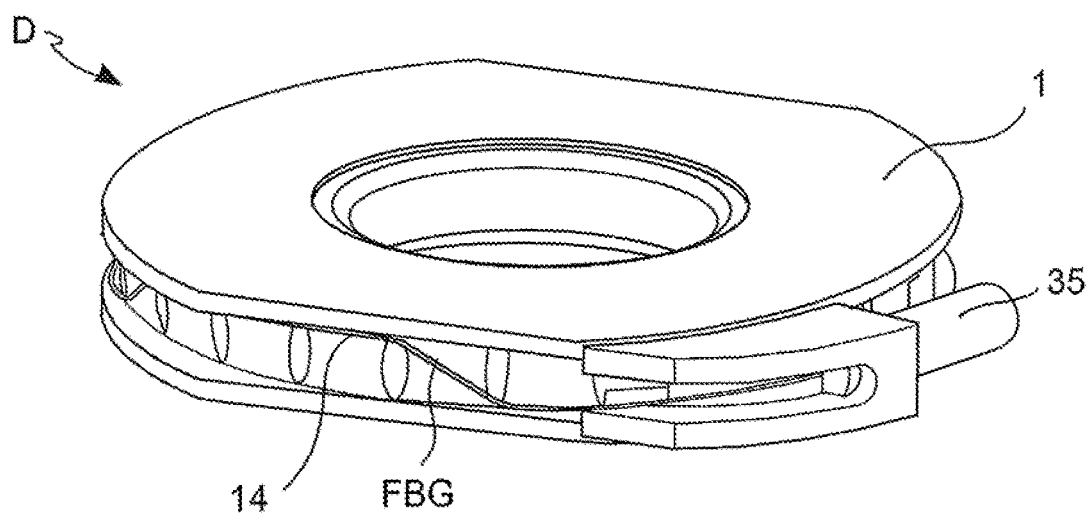
Figure 6:
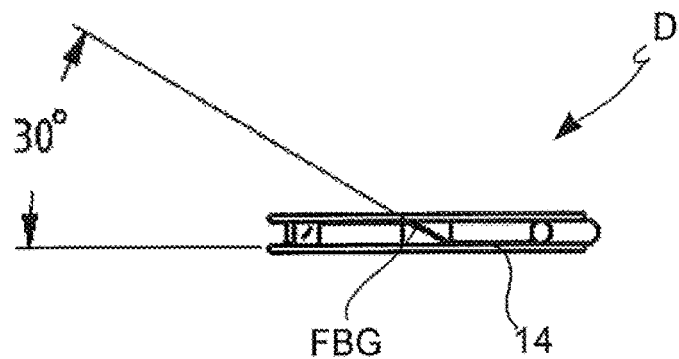

According to an implementation option, the method comprises the further steps of transmitting, by the optical reading/interrogation element 4, through the connection optical fiber 3, respective optical activation radiations (OA1, OA2, OA3, OA4, OA5, OA6) to the plurality of deformation and/or strain sensors, at different respective operating wavelengths ($\lambda 1$, $\lambda 2$, $\lambda 3$, $\lambda 4$, $\lambda 5$, $\lambda 6$), by means of wavelength-division multiplexing (WDM) transmission techniques; the method then provides receiving, through the connection optical fiber 3, and distinguishing the respective optical spectra (as indicated in FIG. 2A) or reflected (as shown in FIG. 2B) by each of the plurality of deformation and/or strain sensors (FBG1, FBG2, FBG3, FBG4, FBG5, FBG6), by means of de-multiplexing with wavelength-division multiplexing (WDM) techniques, wherein each of said optical reflected spectra corresponds to a respective photonic signal (L1, L2, L3, L4, L5, L6).

According to an implementation option, each connection between each fiber in which the fiber Bragg grating type sensors are obtained and a respective connection optical fiber to the optical reading/interrogation unit is made by means of a fiber splice or a detachable photonic connection element (optical connector).

According to an implementation option, the method comprises, before the step of determining, the step of transmitting to a control unit 20 the aforesaid at least one electrical signal E and/or auxiliary electrical signal Et.

In this case, the step of determining comprises calculating the braking torque BT, by a processor of the control unit 20 by means of one or more algorithms executed by one or more software programs, based on the aforesaid at least one electrical signal E or based on the aforesaid at least one first electrical signal E and said auxiliary electrical signal Et, or based on the aforesaid plurality of said plurality of electrical signals (Ea, E1, E2, E3, E4, E5, E6; Eij) and of the at least one auxiliary electrical signal Et.

According to an embodiment of the method, the step of calculating comprises calculating the braking torque BT by means of predefined non-linear relationships between the braking torque and the deformation and/or strain detected by at least one deformation and/or strain sensor FBG in the respective position in which it is incorporated in the washer device D.

Such predetermined non-linear relationships are represented by computerized models or look-up tables stored to be accessible by said processor of the control unit 20.

The aforesaid predefined non-linear relationships are determined by means of testing and/or characterization and/or calibration performed after at least one washer device D containing at least one deformation and/or strain sensor D which has been placed and fixed at a respective fixing interface between the brake caliper body and the brake caliper support.

According to an implementation option of the method (illustrated for example in FIG. 3A), the step of calculating comprises, for each of the four washer devices D1, D2, D3, D4 a respective non-linear model NM1, NM2, NM3, NM4 adapted to determine the three vector components of the respective vector force, i.e., tri-axial, acting on the washer device F1, F2, F3, F4; then, calculating the braking torque BT based on the tri-axial forces F1, F2, F3, F4 determined by the four non-linear models.

Figure 9:
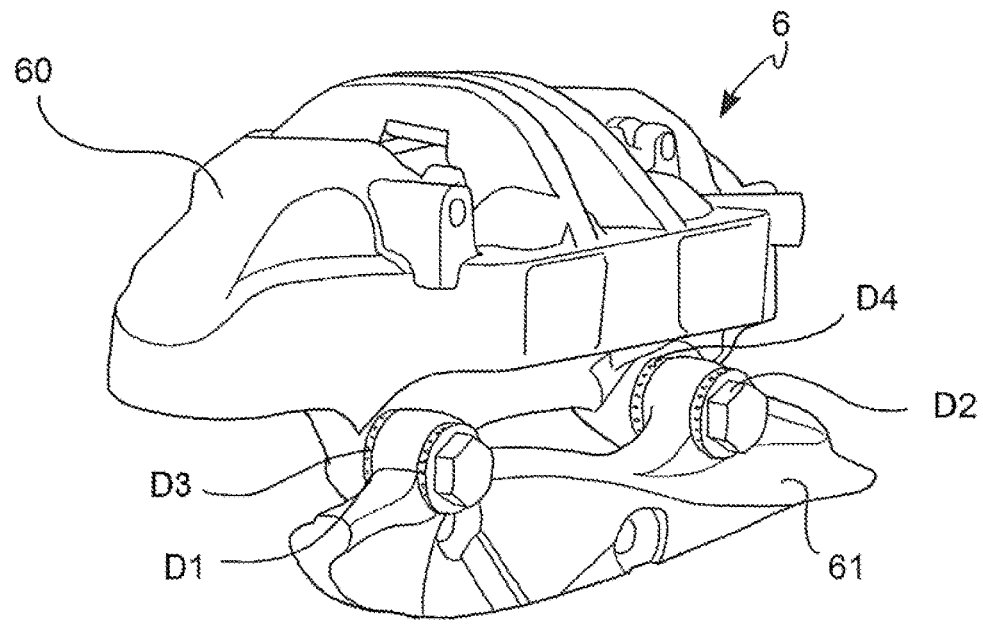
FIGS. 9 and 10 show a perspective view and an exploded perspective view of a further embodiment of a sensorized brake caliper according to the present invention.
Figure 10:
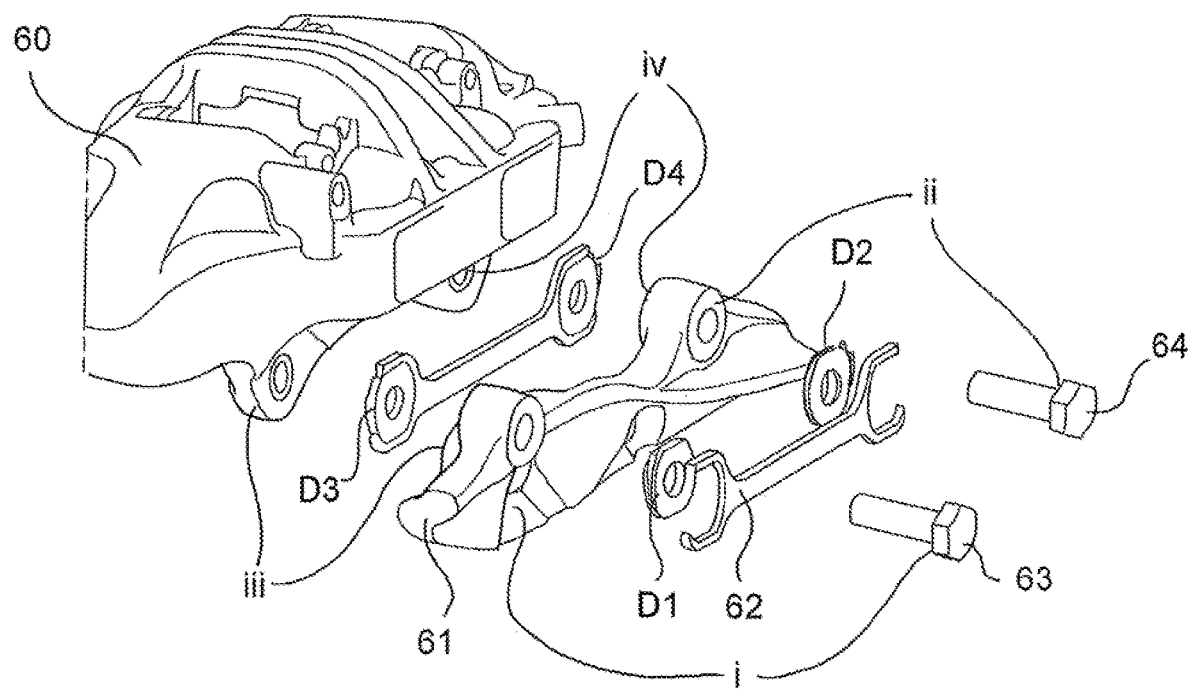

According to another implementation option of the method, (illustrated for example in FIG. 3B), the step of calculating comprises defining, for each of the two washer devices D1, D2 (or, similarly, for any other combination of two washers between the washers D1, D2, D3, D4 shown in FIGS. 9 and 10), a respective non-linear model NM1, NM2, adapted to determine the three vector components of the respective vector force, i.e., tri-axial, acting on the washer device F1, F2; then calculating the braking torque BT based on the tri-axial forces F1, F2, determined by the four non-linear models.

According to an implementation option, the step of defining a non-linear model for a washer device comprises: defining a basic non-linear model by means of functional and/or structural simulations, for example, calculations based on finite element methods (FEM); then refining the parameters of the non-linear model by means of an initial calibration phase, based on strain measurements Sij detected by the respective fiber-optic strain sensors of the washer device and simultaneous measurements of the physical quantities which generate said strains Sij under known experimental conditions, wherein the aforesaid physical quantities comprise, for example, the braking torque BT, the preload due to the tension of the fixing screw upon assembly V and/or the pressure P applied by the brake caliper.

For example, FEM simulations can offer non-linear models of the relationship between measured strains at one or more points of the interface between body and caliper support, containing adjustable parameters. Calibration operations are then carried out in the laboratory, based on experimental measurements under known conditions of screw tension preload and brake caliper pressure. In this initial step of calibrating, in the laboratory, both the strains present at one or more points of the interface between the body and the caliper support (by means of respective washer devices), and at one or more points of each washer device, and the braking torque generating such strains, can be measured. The aforesaid measurements allow adjusting the parameters of the basic non-linear models, thus effectively allowing the characterization of the non-linear ratio between the detected strains and the braking torque that generated them.

The aforesaid calculations and processing allow defining non-linear relationships between strain measurements in one or more points of the interface between the caliper body and the support and the braking torque, thus allowing estimating the braking torque based on the performed strain measurements.

According to an embodiment of the method, the step of processing comprises obtaining a dynamic measurement of the trend of the braking force and/or torque BT in real-time, based on the time evolution of the detected deformation and/or strain.

A deformation and/or strain detecting washer device D will now described making reference to FIGS. 4-6, 7A, 7B, 8A, 8B, 8C.

Such washer device D comprises a device body 1, and an optical fiber 14 containing one or more fiber Bragg grating FBG type strain sensors.

The device body 1 is shaped as a washer or a substantially disc-shaped plate which extends mainly along a radial reference plane p and has a first flat face 11 and a second flat face 12, parallel to the radial reference plane p, adapted to be placed in close contact with surfaces of fixing means and/or the brake caliper support 61 and/or the brake caliper body 60 so that they can be mounted at a fixing interface (i, ii, iii, iv) between brake caliper body 60 and brake caliper support 61, or between the brake caliper support 61 and a head of a clamping element 63, 64, or between an axle and a suspension of a vehicle wheel.

The washer body 1 features a tangentially peripheral band (and/or recess) 13 which develops along a portion or perimeter of body 1 of the washer device D.

The washer body 1 is susceptible to deformation when subjected to forces so that the deformation and/or force S locally present in each point of the washer device D is representative of the forces acting on the washer device D.

The optical fiber 14 is arranged along or at the tangentially peripheral band 13.

The optical fiber 14 contains one or more deformation and/or strain fiber Bragg grating fiber-optic strain sensor (FBG), each of which is configured to determine the local deformation and/or strain S acting in the respective detection position, and generating a respective at least one photonic signal L representative of the detected deformation and/or strain S.

Each of the aforesaid fiber-optic strain sensors FBG is obtained in a respective portion of optical fiber inclined with respect to a radial plane p at an acute or obtuse inclination angle different from each of the values 0°, 90°, 180° and 270°, to detect a strain S in a direction different from a normal direction and from a tangential direction and from a tangential or radial direction, with respect to said reference plane p of the washer, so that the detected strain S depends both on the normal component and on the tangential component of the force acting on the sensor and/or on each of the three spatial vector components of the force acting on the sensor.

The optical fiber containing the fiber-optic strain sensor optical fiber FBG is adapted to transmit the aforesaid at least one photonic signal L generated by at least one fiber-optic strain sensor FBG and to receive at least one activation radiation OA intended for a respective at least one fiber-optic strain sensor FBG.

According to an implementation example, the optical fiber 14 is connected to a protective output tube 35, allowing the connection of the device to the optical reading/interrogation unit 4.

According to an implementation option, the aforesaid angle of inclination is within the range of ±30° to ±45°.

According to a preferred implementation option (shown for example in FIG. 6), the aforesaid angle of inclination is ±30°.

According to an embodiment of the device (illustrated for example in FIG. 4), the aforesaid optical fiber comprises a plurality of fiber-optic strain sensors (FBG1, FBG2, FBG3, FBG4, FBG5, FBG6) arranged and/or equally spaced apart along the perimeter development of the optical fiber 14.

Each of the fiber-optic strain sensors (FBG1, FBG2, FBG3, FBG4, FBG5, FBG6) incorporated in a device D is made by means of a respective Bragg grating, associated with a respective central operating wavelength ($\lambda 1$, $\lambda 2$, $\lambda 3$, $\lambda 4$, $\lambda 5$, $\lambda 6$), and is adapted to be energized by means of a respective optical radiation at the respective wavelength (belonging to an optical radiation of total energizing in wavelength-division multiplexing—WDM), and to generate a transmitted or reflected optical spectrum which constitutes the respective photonic signal (L1, L2, L3, L4, L5, L6).

According to a preferred implementation option, the aforesaid plurality of fiber-optic strain sensors FBG comprise six fiber-optic strain sensors (FBG1, FBG2, FBG3, FBG4, FBG5, FBG6).

According to an implementation example, the central operating wavelengths of the six aforesaid fiber-optic strain sensors are 1535 nm, 1540 nm, 1545 nm, 1550 nm, 1555 nm, 1560 nm.

According to an implementation example, each fiber-optic strain sensor FBG has a 1 mm long grating and 50% or more reflectivity; the six fiber-optic strain sensors are evenly spaced, with a distance of 14 mm from one another.

According to an implementation option, the aforesaid optical fiber 14 further comprises a fiber-optic temperature sensor 5.

According to possible implementation options, the geometry of the body of the washer device D and the material of which the body of the washer device D is made are chosen as a function of the requirement to ensure mechanical strength to axial fixing preload and to the shearing force resulting from the braking action, and the requirement to optimize the deformation of the body of the washer device D without reaching critical structural strains.

In particular, according to preferred examples of implementation, the body of the washer device D is made of steel, or titanium, or aluminum.

According to different implementation options, the washer device D may consist of various parts which are bound together and/or various parts which can be mutually detached and reattached. In particular, body 1 of the washer device D may consist of various parts which are bound together and/or various parts which can be mutually detached and reattached.

According to a particular implementation option, the body of the washer device D features ellipsoidal section recesses 15 along the annular recess at which the optical fiber containing the fiber-optic strain sensors is placed, and radial cavities 16 in the body of the washer device D having the aforesaid ellipsoidal recesses as their external ends.

According to an implementation option, the perimeter of the washer device D features two opposite straight sides and two other opposite arc-of-circle-shaped sides.

Figure 8B:
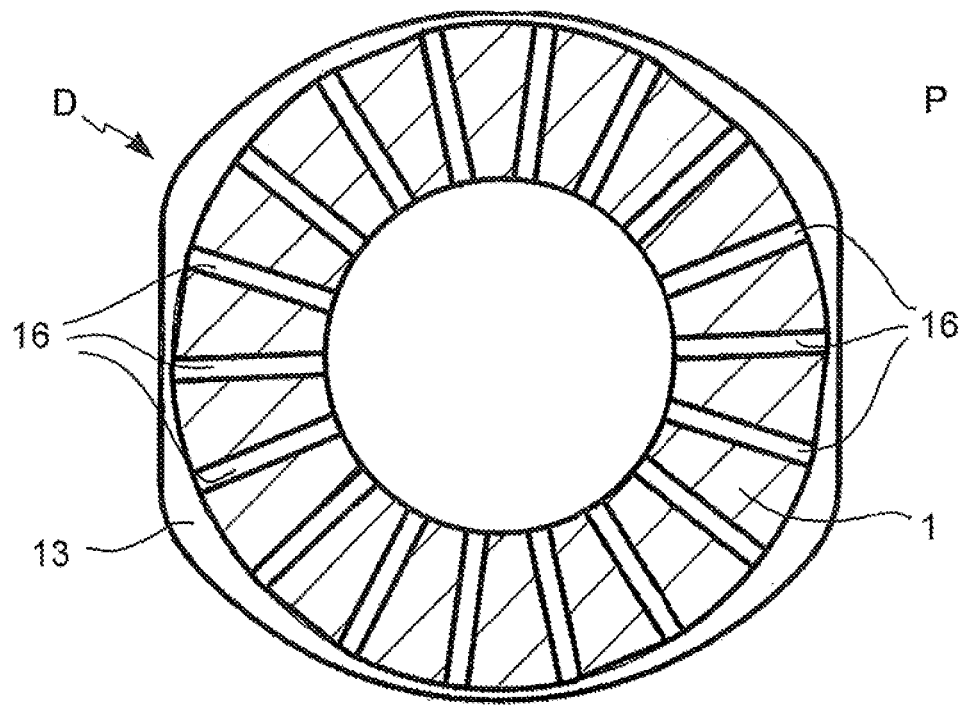
Figure 8C:
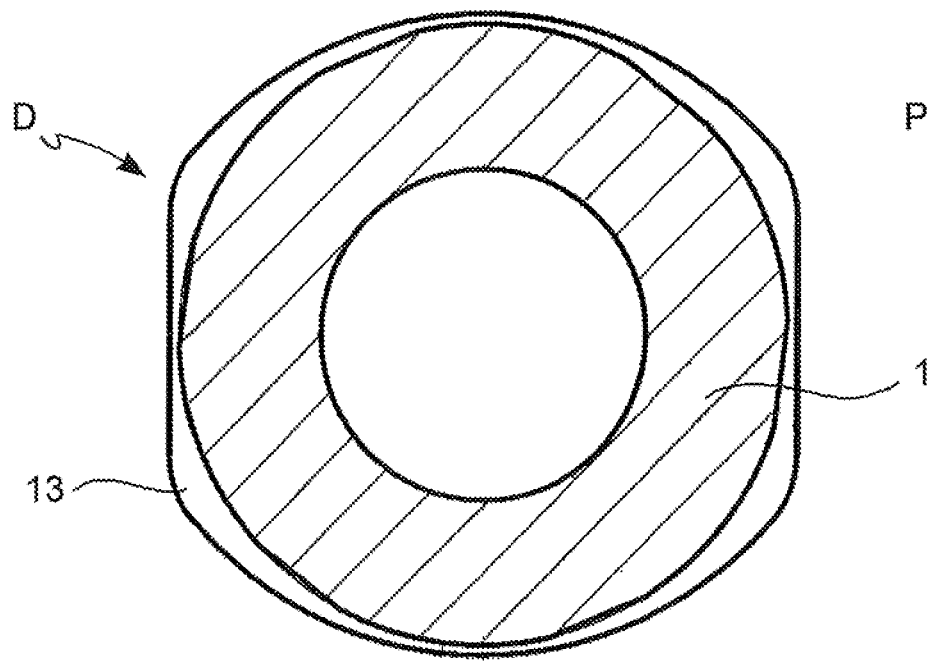

FIGS. 8A, 8B and 8C show, by means of sectional views, three specific design examples of a washer device D, developed for a steel, titanium, and aluminum device, respectively. The aluminum washer in FIG. 8C has no ellipsoidal end cavities.

According to an embodiment of the washer device D, the first flat face 11 and the second flat face 12 of the device body 1 (washer-shaped or substantially disc-shaped plate) have a surface alteration which increases the friction between said first and second flat faces and the surfaces of the fixing equipment and/or the brake caliper support 61 and/or the brake caliper body 60, with which the aforesaid first and second flat faces are in contact, respectively, in operating conditions in which they are mounted at one of the aforesaid fixing interfaces (i, ii, iii, iv).

According to an implementation option of the aforesaid embodiment, the aforesaid surface alteration of the flat faces is obtained by means of a mechanical processing known in itself, for example, knurling.

According to another implementation option of the aforesaid embodiment, the aforesaid surface alteration of the flat faces is obtained by means of a "texturing" of the surface made with laser technology, or equivalent, in a manner known in itself, applicable on any metal surface, such as steel, titanium or aluminum.

According to another implementation option of the aforesaid embodiment, the aforesaid surface alteration of the flat faces is obtained by means of a coating. In this regard, various processes may be used, such as the deposition of diamond particles, or silicon carbide, SiC, embedded in electrolytic nickel, or ESD (Electro-Spark Deposition) of tungsten carbide, stellite, or aluminum oxides if the substrate is aluminum or other known methods.

According to several possible implementation options, the aforesaid surface alteration of the flat faces is obtained by means of finishing by mechanical removal, or machining by local deformation of the material (upsetting, knurling), or laser removal (or machining) which can lead to material vaporization, melting or combustion, or a variety of possible coating techniques, e.g., based on nanotechnology, very hard nanopowders which generate contact points with high exchange of forces and therefore high friction, hard inclusions which affect the surface locally creating "grips", or other.

It is worth noting that the embodiment described above allows increasing the friction between the sensor and the caliper body or caliper support, which can be particularly advantageous in the context of the present invention in which, as already explained above, the forces acting on the washer device D determine deformation of the body of such washer device which, in turn, determines an effort detected by the FBG sensors.

In particular, the effect of this embodiment is to remove or significantly reduce phenomena of local variation of the strains due to the reversal of the vehicle motion: indeed, by means of the measures taken, the friction coefficient on the interface surfaces is increased. By doing so, it is possible to either avoid or significantly reduce those micro-settings which, at the change between forward and reverse, change the local friction conditions and, consequently, the distribution of strains on the body surface of the washer device. This is very important because if local conditions change with each change of direction of the vehicle, the washer deforms differently and the output characteristic of the sensor is poorly repeatable and non-linear. On the other hand, by virtue of the aforesaid characteristics of this embodiment, the effects induced by the braking torque on the sensitive elements between forward and reverse conditions are standardized and made deterministic, thus improving the repeatability and linearity of the sensor output characteristic.

A system 100 for determining a braking torque BT resulting from the actuation of a vehicle braking system, by detection performed at at least one fixing interface (i, ii, iii, iv) between a brake caliper body 60 and a respective support 61, or between the brake caliper support 61 and a head of a clamping element 63, 64, or between the axle and the wheel suspension will now be described making reference to FIGS. 1-14.

The system 100 comprises at least a washer device D, according to any of the previously shown aforesaid embodiments, an optical reading/interrogation unit 4 and a remote control unit 20.

At least one washer device D is fixed and pressed between the brake caliper body 60 and the brake caliper support 61, at at least one said respective fixing interface (i, ii, iii, iv), or between the brake caliper support 61 and a clamping element head 63, 64, or between the axle and the wheel suspension.

The optical reading/interrogation unit 4 is optically connected to at least one washer device D to receive the aforesaid at least one photonic signal L. The optical reading/interrogation unit 4 is configured to generate at least one electrical signal E representative of the detected deformation and/or strain S, based on at least one received first photonic signal L.

The remote control unit 20 is connected to the optical reading/interrogation unit 4 to receive the aforesaid at least one first electrical signal E and is configured to process the aforesaid at least one first electrical signal E representative of the deformation and/or strain S to obtain and provide a measurement of the braking torque BT.

According to an embodiment (illustrated for example in FIGS. 3A and 3B, with four and two washer devices, respectively), the system comprises a plurality of washer devices (D1, D2, D3, D4), each at a respective fixing interface (i, ii, iii, iv).

According to an implementation option, each of the aforesaid washer devices incorporates a plurality of deformation and/or strain sensors (FBG1, FBG2, FBG3, FBG4, FBG5, FBG6).

In this case, the remote control unit 20 is configured to determine the braking torque BT based on a plurality of electrical signals Ejk, each resulting from a respective photonic signal Ljk representative of a respective deformation and/or strain Sij, detected by a respective fiber-optic strain sensor. In the notations used here, j is an index indicating one of the plurality of washer devices and k is an index indicating one of the plurality of fiber-optic strain sensors comprised in the washer device.

According to a preferred implementation option (illustrated in FIG. 3, as far as functional aspects are concerned, and in FIGS. 7 and 8, as far as structural aspects are concerned), the system comprises: a first washer device D1 at a first fixing interface (i) between the head of a first fixing bolt 63 and a first portion of the caliper support 61; a second washer device D2 at a first fixing interface (ii) between the head of a second fixing bolt 64 and a second portion of the caliper support 61; a third washer device D3 at a third fixing interface (iii) between a third portion of the caliper support 61 and the caliper body 60; a fourth washer device D4 at a fourth fixing interface (iv) between a fourth portion of the caliper support 61 and the caliper body 60.

According to an implementation option (illustrated for example in FIGS. 4, 5, 6A, 6B) the one or more fiber-optic strain sensors FBG are comprised in an optical fiber 14 arranged within a tangentially peripheral band 13 of the washer device.

Each of such fiber-optic strain sensors FBG is obtained in a respective portion of optical fiber inclined with respect to a radial plane of the washer p (e.g., a plane of the sections in FIGS. 8A, 8B, 8C) at an acute or obtuse inclination angle different from each of the values 0°, 90°, 180°, and 270°, to detect a strain S in a direction different from a normal direction and from a tangential direction, with respect to the washer, so that the detected strain S depends both on the normal component and on the tangential component of the force acting on the sensor.

According to an embodiment (shown for example in FIG. 2), the system comprises at least one respective fiber-optic temperature sensor 5 of the fiber Bragg grating type incorporated in the at least one washer device D.

The at least one temperature sensor 5 is configured to detect a temperature value T present in the respective position and to generate a respective at least one auxiliary photonic signal Lt representative of the measured temperature value T.

In this case, the optical reading/interrogation unit 4 is optically connected to the at least one temperature sensor 5 and is configured to receive the at least one generated auxiliary photonic signal Lt, and to generate at least one auxiliary electrical signal Et representative of the temperature, based on at least one received auxiliary photonic signal Lt.

In this case, the remote control unit 20 is configured to process at least one first electrical signal E and at least one auxiliary electrical signal Et to obtain a measurement of the braking force BT taking a temperature compensation into account.

According to an implementation option of the system, the aforesaid at least one temperature sensor 5 comprises a fiber Bragg grating made in the same optical fiber 14 in which the at least one deformation and/or strain sensor FBG is made.

According to an embodiment of the system (illustrated for example in FIG. 1), the fiber-optic strain sensor FBG is connected to the optical reading/interrogation unit 4 by means of a first connection optical fiber 31.

In this case, the optical reading/interrogation unit 4 is configured to activate the fiber-optic temperature sensor by transmitting an optical activation radiation OA through the first connection optical fiber 31 and the second photonic signal L comprises an optical spectrum L reflected by the temperature sensor FBG, which reaches the optical reading/interrogation unit 4 through the first connection optical fiber 31.

According to another embodiment (illustrated for example in FIG. 2), the fiber-optic strain sensor FBG is connected to the optical reading/interrogation unit 4 by means of a first input connection optical fiber 32 and a second output connection optical fiber 33.

In this case, the optical reading/interrogation unit 4 is configured to activate the aforesaid fiber-optic temperature sensor FBG transmitting an optical activation radiation OA through the first input connection optical fiber 32 and the second photonic signal L comprises a second optical spectrum L transmitted by the temperature sensor FBG of the fiber Bragg grating type, which reaches the optical reading/interrogation unit 4 through said second output connection optical fiber 33.

According to another embodiment of the system (shown in FIG. 2), each of the fiber-optic strain sensors (FBG1, FBG2, FBG3, FBG4, FBG5, FBG6) of a device is made by means of a respective Bragg grating, associated with a respective central operating wavelength (λ1, λ2, λ3, λ4, λ5, λ6).

Each of the fiber-optic strain sensors (FBG1, FBG2, FBG3, FBG4, FBG5, FBG6) is configured to generate a respective at least one photonic signal of a plurality of photonic signals (L1, L2, L3, L4, L5, L6).

The optical reading/interrogation unit 4 is configured to receive the plurality of photonic signals (L1, L2, L3, L4, L5, L6), and to generate at least one respective electrical signal (E) of a plurality of electrical signals (E1, E2, E3, E4, E5, E6), based on said plurality of received photonic signals (L1, L2, L3, L4, L5, L6);

The remote control unit 20 is configured to process the aforesaid plurality of electrical signals (E1, E2, E3, E4, E5, E6) to obtain a measurement of the braking torque BT.

According to an implementation option, the optical reading/interrogation unit 4 is further configured to transmit through the connection optical fiber 3, respective optical activation radiations (OA1, OA2, OA3, OA4, OA5, OA6) to the plurality of deformation and/or strain elements, at different respective operating wavelengths (λ1, λ2, λ3, λ4, λ5, λ6), by means of wavelength-division multiplexing (WDM) transmission techniques; and to receive, through the connection optical fiber 3, and distinguishing the respective optical spectra reflected by each of the plurality of deformation and/or strain sensors (FBG1, FBG2, FBG3, FBG4, FBG5, FBG6), by means of de-multiplexing with wavelength-division multiplexing (WDM) techniques, wherein each of said optical reflected spectra corresponds to a respective photonic signal (L1, L2, L3, L4, L5, L6).

According to an embodiment of the system, the control unit 20 comprises a processor configured to calculate the braking torque BT by means of one or more algorithms executed by one or more software programs, based on the aforesaid at least one electrical signal E or based on the aforesaid at least one electrical signal E and said auxiliary electrical signal Et, or based on the aforesaid plurality of electrical signals (Ea, E1, E2, E3, E4, E5, E6; Eij) and of the aforesaid at least one auxiliary electrical signal Et.

According to different implementation options of the system, the remote control unit 20 is configured to determine the braking torque BT, based on the electrical signals E representative of the detected strains S, through the algorithms and/or procedures previously described illustrating the method according to the invention.

Figure 12:
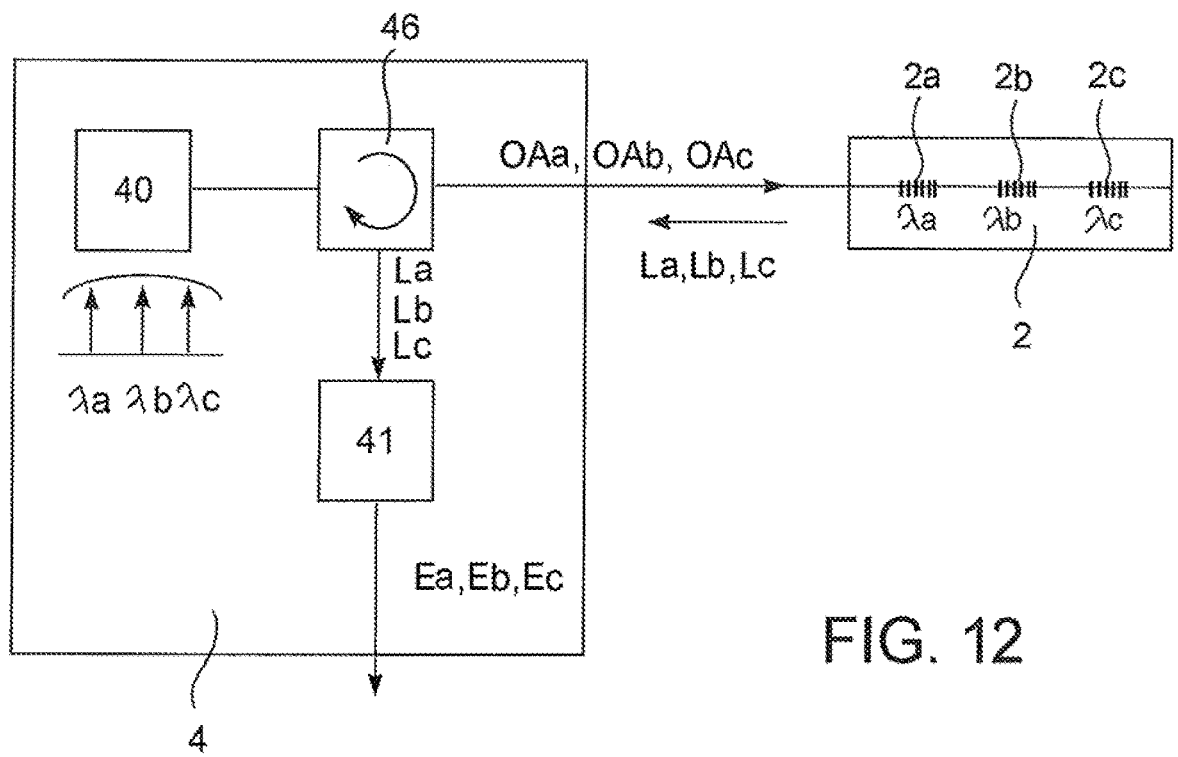
FIGS. 12-14 are functional block diagrams of respective implementation options of an optical reading/interrogation unit comprised in the aforesaid system for determining a braking torque.
Figure 13:
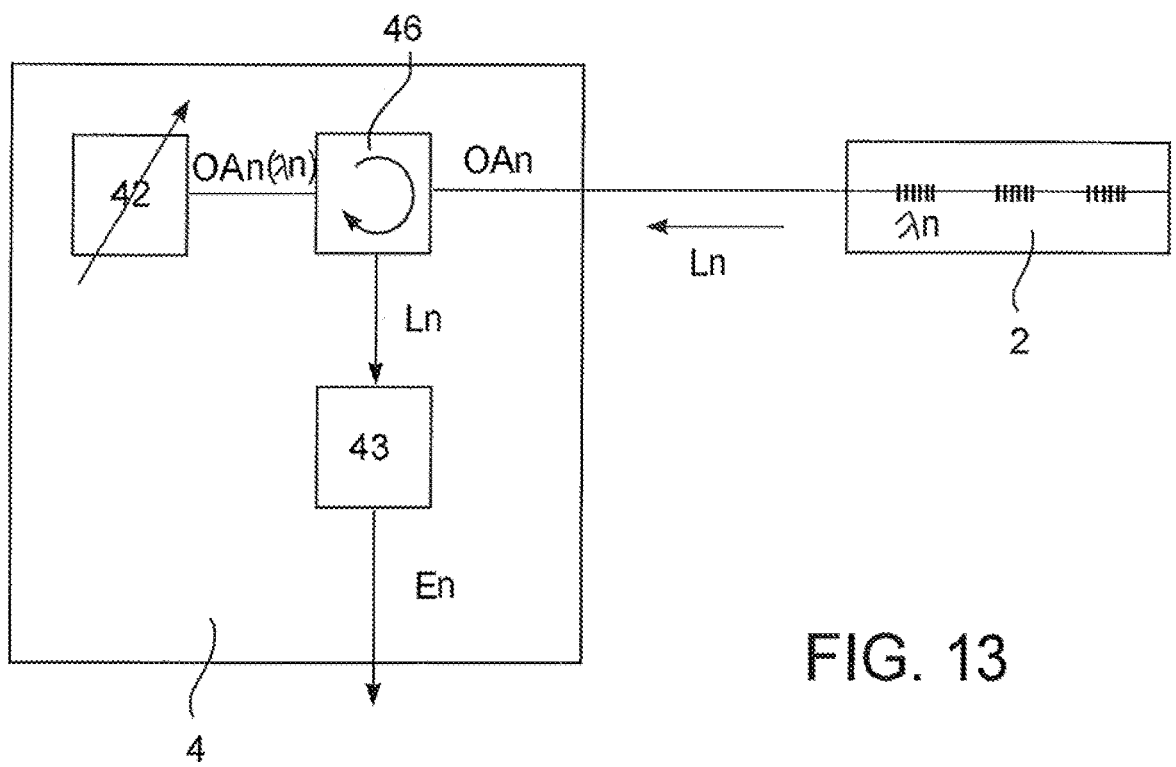
Figure 14:
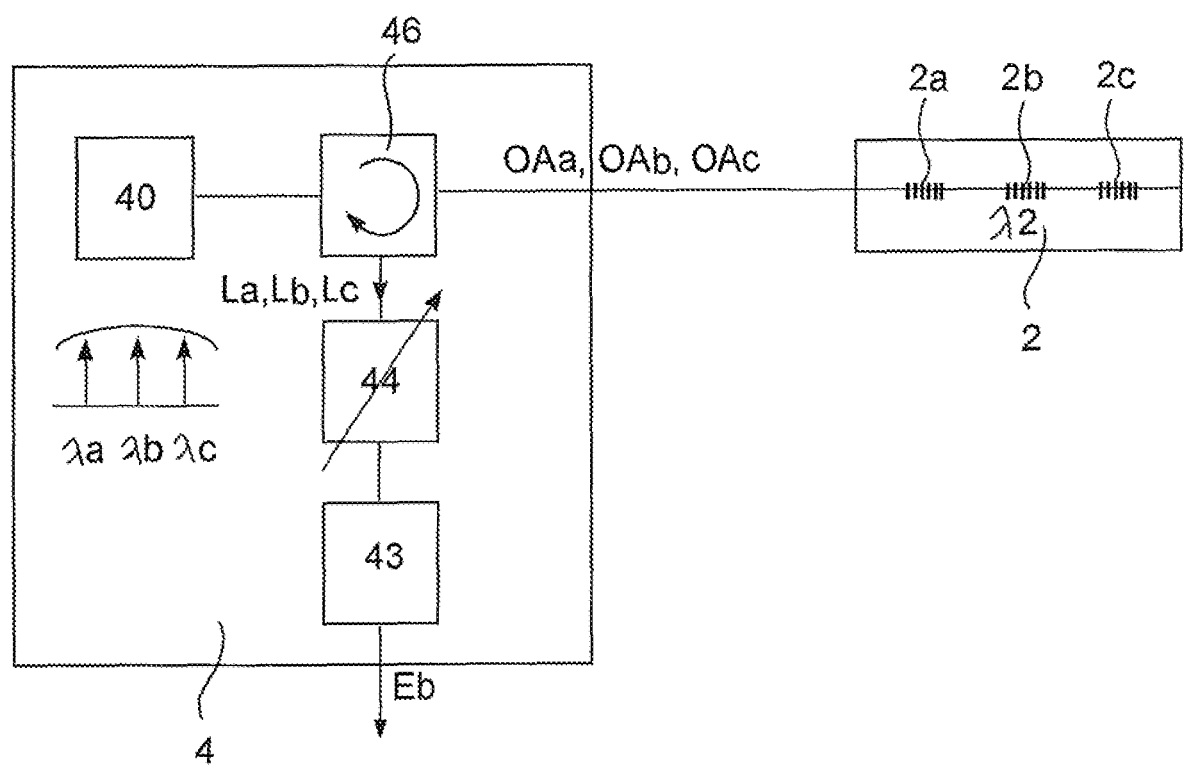

With reference to FIGS. 12-14, further illustrative details will now be provided, by way of example, related to the reading/interrogation unit 4.

According to an embodiment of the system 100, the optical reading/interrogation unit 4 comprises a broadband optical radiation source 40, an optical circulator 46, and an opto-electronic spectrometer receiver 41.

The broadband optical radiation source 40 is configured to transmit a first activation optical radiation OA or a plurality of second activation optical radiations OAa, OAb, OAc and/or the second activation optical radiation OAt.

The opto-electronic spectrometer receiver 41 is configured to select the wavelength and/or the plurality of wavelengths to be received and is also configured to receive the aforesaid first photonic signal L, or the aforesaid plurality of first photonic signals La, Lb, Lc and convert them into the first electric signal E, or the plurality of first electric signals Ea, Eb, Ec, and/or to receive the aforesaid second photonic signal Lt and convert it into the second electric signal Et.

In this embodiment, multiplexed FBG sensors in the wavelength domain (WDM) are queried using a technique based on a broad spectrum source and spectrometer (as shown in FIG. 12).

The broad-spectrum source may comprise, for example, a super-luminescent diode or a spontaneous emission source (such as a semiconductor optical amplifier or an erbium-doped fiber optical amplifier) and is used to illuminate (through the input port and the through port of the optical circulator 46) the FBG sensors 2a, 2b, 2c characterized by reflectivity peaks at different wavelengths (Aa, Ab, Ac) not superimposed on each other.

The different photonic signals La, Lb, Lc, at their respective wavelengths, are retro-reflected by FBG sensors (in the example shown in FIG. 12) and are coupled to a spectrometer 41 through the output port of the optical circulator 46.

The spectrometer 41 is, for example, a dispersive element, typically made by means of a Phase Grating Volume, able to spatially separate the different spectral components of the signal. Such spatially separated signal components are coupled to an array of photo-receivers capable of generating signals with intensity values corresponding to the various wavelengths.

Each photo-receiver is sensitive to optical radiation corresponding to a well-defined spectral region, thus providing the possibility to reconstruct the entire spectrum, in the spectral range of interest.

According to another embodiment of the system 100 (illustrated in FIG. 13), the optical reading/interrogation unit 4 comprises a tunable optical radiation source 42, an optical circulator 46, and a photo-diode opto-electronic receiver 43.

The tunable optical radiation source 42 is configured to transmit the desired optical radiation OAn (at the respective wavelength λn) between the possible first optical activation radiation OAa, OAb, OAc, or the second optical activation radiation OAt, at wavelength λt, at a given time.

The emitted optical radiation OAn illuminates (through the input port and the through port of the optical circulator 46) the optical fiber containing the FBG sensors, and determines a response by the FBG sensors sensitive to the wavelength λ1, which generates a recto-reflected photonic signal Ln, which is coupled to the photo-diode receiver 43 through the output port of the optical circulator 46.

The photo-diode opto-electronic receiver 43, configured to receive the first photonic signal Ln and convert it into a first electrical signal En (or similarly to receive the second photonic signal Lt and convert it into said second electrical signal Et).

In this embodiment, multiplexed FBG sensors in the wavelength domain (WDM) are interrogated using a tunable laser and photo-diode based technique.

According to various embodiments, the tunable optical radiation source 42 is a tunable laser, used in the known "agile tunable" or "swept wavelength" modes.

According to another embodiment of the system 100 (diagrammatically shown in FIG. 14), the optical reading/interrogation unit 4 is entirely made by means of a single photonic integrated circuit using PIC technology. In this case, such single integrated photonic circuit comprises a broadband optical radiation source 40, at least one wavelength optical filtering element 44, and an opto-electronic photo-diode receiver 43.

The broadband optical radiation source 40 is configured to transmit a first activation optical radiation OA or a plurality of second activation optical radiations OAa, OAb, OAc and/or the second activation optical radiation OAt.

The emitted optical radiation (which comprises, in the example of FIG. 14, the optical radiations OAa, OAb, OAc), through the input port and the through port of the optical circulator 46, illuminates the optical fiber containing the FBG sensors, each of which reflects a respective photonic signal La, Lb, Lc. The photonic signal WDM as a whole, given by the sum of the signals La, Lb, Lc, each at its own and different wavelength, is conveyed to the input of the filter-optic element 44, through the output port of optical circulator 46.

The at least one wavelength optical filtering element 44 can be tuned in the surround of the wavelength of the interrogated fiber Bragg grating, in order to select a respective photonic signal (the photonic signal Lb at the wavelength Ab in the example in FIG. 14). The optical filtering element 44, being tunable, can be tuned to different wavelengths, in order to select in sequence or at different times according to what is desired, the photonic signal reflected by any one of the FBG sensors.

The opto-electronic photo-diode 43 receiver is configured to receive the photonic signal selected among the aforesaid photonic signals and convert it into one or more electrical signals, and/or to receive the second photonic signal Lt, if selected, and convert it into the second electrical signal Et.

A sensorized brake caliper 6 for a vehicle braking system is described below with reference to FIGS. 9, 10, 11.

The sensorized brake caliper 6 comprises a brake caliper body 60, a brake caliper support 61, a first fixing bolt 63 and a second fixing bolt 64, and at least one washer device D according to any of the embodiments described above.

The at least one washer device D is fixed and pressed between the brake caliper body 60 and the brake caliper support 61 at at least one fixing interface (i, ii, iii, iv) between the brake caliper body 60 and the brake caliper support 61.

According to different implementation options, the brake caliper is a fixed or floating brake caliper.

According to an implementation option, the sensorized caliper 6 further comprises an optical reading/interrogation unit 4, which can be connected to a remote control unit 20 external to the brake caliper.

The optical reading/interrogation unit 4 is according to what is described above.

In particular, said optical reading/interrogation unit 4 is optically connected to first photonic connection means 3 to receive at least one photonic signal L and is configured to determine at least one electrical signal E representative of the detected deformation and/or strain S based on at least one received photonic signal L. The aforesaid at least one electrical signal E is adapted to be transmitted to the remote control unit 20.

According to a preferred implementation option, the sensorized brake caliper 6 comprises: a first washer device D1 at a first fixing interface (i) between the head of a first fixing bolt 63 and a first portion of the caliper support 61; a second washer device D2 at a first fixing interface (ii) between the head of a second fixing bolt 64 and a second portion of the caliper support 6; a third washer device D3 at a third fixing interface (iii) between a third portion of the caliper support 61 and the caliper body 60; a fourth washer device D4 at a fourth fixing interface (iv) between a fourth portion of the caliper support 61 and the caliper body 60.

According to different possible implementation options, the brake caliper is a disc brake caliper, fixed or floating, or a caliper with radial and axial connections, or mono-bloc or floating caliper, or hydraulic or electro-actuated caliper.

As noted above, the optical reading/interrogation unit 4 is integrated and/or housed in the sensorized caliper 6. In this case, electrical signals E are output from the sensorized caliper and directed to the remote control unit.

According to another implementation option of the system, the optical reading/interrogation unit 4 is external to the sensorized brake caliper 6. In this case, photonic signals L are emitted from the sensorized caliper, on fiber, directed towards the optical reading/interrogation unit 4.

According to an implementation option, the sensorized brake caliper comprises a positioning element 62 of the washer devices D adapted to retain and position one or more washer devices D in the correct position.

Figure 11:
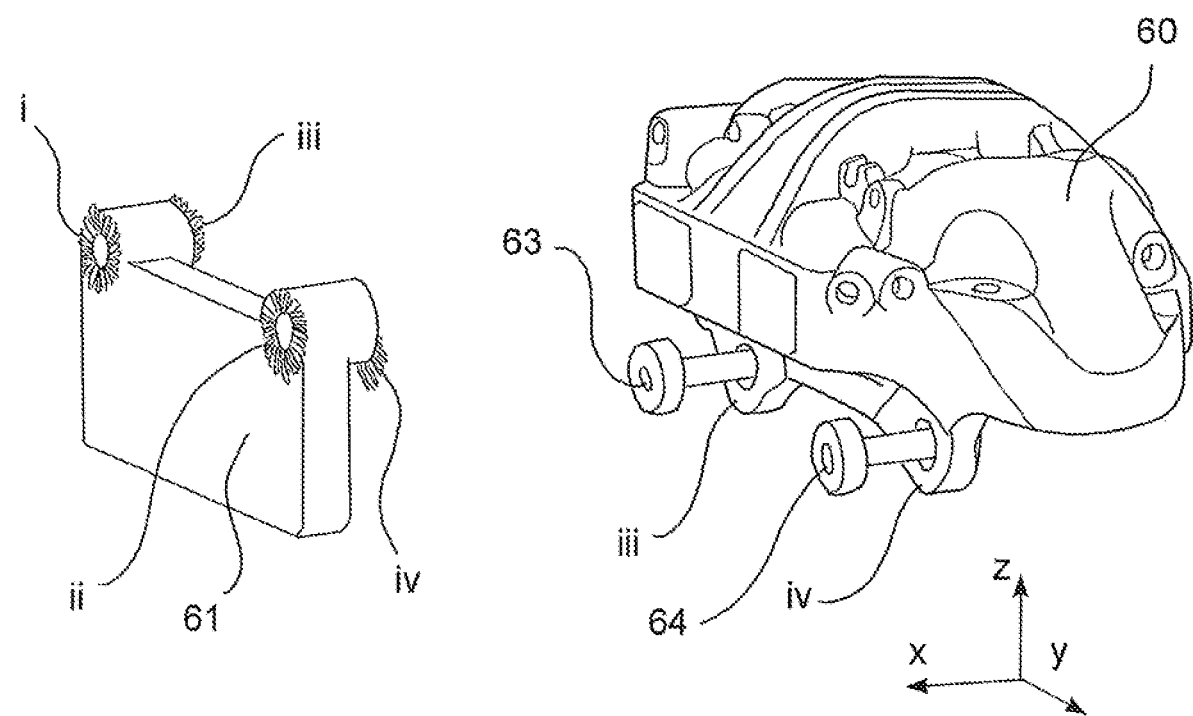
FIG. 11 shows some details of a fixing interface between brake caliper body and brake caliper support, in which washer devices, such as those in FIGS. 4-6, 7A, 7B, 8A, 8B, 8C, are mounted, according to an embodiment of the invention.

With reference to FIG. 11, some further details about the relationship between braking torque, forces acting on washer devices and forces acting on fiber-optic strain sensors are here provided.

When a braking torque is applied to the braking rotor, mechanical actions opposed to the braking torque are applied through the connections on the brake caliper body. Reciprocal actions of these actions are thus applied on the hub. The aforesaid mechanical actions can be represented in terms of forces and moments acting at the support interfaces. The interfaces between the brake caliper and hub bolts (i.e., between portions of the brake caliper body and portions of brake caliper support) were defined above as (i), (ii), (iii), (iv), as also shown in FIGS. 10 and 11.

Considering the x, y, z coordinates and interfaces (i), (ii), (iii), (iv), shown in FIG. 11, the following quantities can be defined.

$F_{n-iii}$ and $F_{n-iv}$ are normal forces exchanged between the brake caliper and brake caliper support and due to the action of bolts 63 and 64, respectively. $F_{n-i}$ and $F_{n-ii}$ are the normal forces exchanged between the head of each bolt and the brake caliper support. Furthermore, the moments of the torques on the z-y plan ($M_{z-i}$, $M_{z-ii}$, $M_{z-iii}$, $M_{z-iv}$, $M_{y-i}$, $M_{>y-ii}$, $M_{y-iii}$, $M_{y-iv}$) are generated by normal force distributions on each contact interface.

Finally, the moments of the torques along the x-direction ($M_{x-i}$, $M_{x-ii}$, $M_{x-iii}$, $M_{x-iv}$) and the forces in the z-y plane ($F_{z-i}$, $F_{z-ii}$, $F_{z-iii}$, $F_{z-iv}$, $F_{y-i}$, $F_{y-ii}$, $F_{y-iii}$, $F_{y-iv}$) are due to the friction interaction between the caliper contact surfaces, the caliper support and the bolt heads.

The sum of the torque contribution with respect to the wheel axle of each of the aforesaid frictions represents the braking torque reaction action.

The invention also encompasses a vehicle braking system, comprising a plurality of sensorized brake calipers 6 according to any one of the embodiments of sensorized calipers described above.

The invention further comprises a vehicle braking system comprising a system 100 for determining a braking torque BT resulting from the implementation of a vehicle braking system according to any one of the embodiments for determining a braking torque BT described above.

The invention further comprises a manufacturing method of a washer device D according to any one of the embodiments shown above.

Such manufacturing method comprises the steps of positioning on the side surface of the washer of the washer device D an optical fiber 14 previously prepared by inscribing the fiber-optic strain sensors (FBG) arranged according to a pre-determined spacing; positioning each portion of fiber inscribed with a respective strain sensor FBG in a respective inclined direction, at a predetermined inclination angle with respect to a radial reference plane p of the washer, along the side surface of the washer; fixing a shaped box to the washer and to the optical fiber to protect and orient the outgoing fiber; fixing the optical fiber 14 and its inclined fiber portions comprising the fiber-optic strain sensors FBG on the side band of the washer and in the output box with binder material; applying a protective layer around the peripheral side band of the washer in which the optical fiber 14 is arranged.

According to another embodiment, the aforesaid manufacturing method comprises the further step of modifying the first flat face 11 and the second flat face 12 of the device body 1 by means of a surface alteration adapted to increase the friction between the aforesaid first and second flat faces and the surfaces of the fixing equipment and/or support of the brake caliper 61 and/or brake caliper body 60, with which the aforesaid first and second flat faces are in contact, respectively, in operating conditions in which they are mounted at one of the fixing interfaces (i, ii, iii, iv).

According to different possible implementation options, the aforesaid surface alteration of the first flat face 11 and the second flat face 12 is achieved by mechanical processing, for example knurling, or "texturing" the surface using laser technology or the like; or a surface coating.

It is worth noting that the object of the present invention is fully achieved by the methods and systems shown above by virtue of the functional and structural features thereof.

Indeed, the detecting washer device shown above can detect deformations and/or forces representative of the forces acting at a clamping interface between a brake caliper body and its support, and/or between brake caliper support and axle, which in turn depend on the braking torque simultaneously, and with good accuracy. In particular, the detecting washer device can detect both the tangential component and the normal component (or, even more specifically, the three vector components) of the forces acting on it.

Furthermore, such device, by virtue of its small size and its "washer" shape, can be advantageously and easily inserted between the apparatus of a wheel and the axle of a vehicle (in particular, between a brake caliper and a brake caliper support), using already provided fixing means, for example, the screws already provided for the attachment of the brake caliper to its support, one or more attachment points.

As shown above, there are many possible arrangements of the device with respect to the brake caliper. On the one hand, this allows great versatility of use, permitting a wide variety of structural options, and on the other hand it provides degrees of freedom to achieve different levels of accuracy according to the requirements: for example, the solutions with a plurality of devices, arranged in different points, and each with a plurality of fiber-optic sensors inside, offers a greater quantity of detections and of respective electrical signals to the control system, allowing more precise processing and estimates.

Other advantages of the device according to the invention are compactness, robustness, ease of installation (e.g., using the fixing systems already provided for fixing the brake caliper), versatility of use in the context of fixed or floating caliper disc brakes in different points and/or splices and/or joints of such systems.

In addition to the aforesaid advantages, there are also the advantages specifically deriving from the use of fiber-optic sensors.

Similar advantages are achieved by virtue of the system and method described above.

The system comprises one or more sensorized brake calipers which include fiber-optic sensors, optically connected to a reading/interrogation unit (which can be remote or also integrated into the brake caliper) for an optoelectronic conversion of the strain information, which, advantageously, can also be based on WDM techniques.

The reading/interrogation unit can be made based on different electro-optical technologies.

Advantageously, such reading/interrogation unit can be made by means of silicon-based photonic technologies (e.g., PIC: Photonics Integrated Circuit), which allows making such unit also by integrating it in the sensorized brake caliper.

The control unit of the system can thus determine the braking torque, with temperature compensation, and over a wide operating range.

The ability to detect the strain at multiple points (since a variety of washer detectors can be used with great flexibility, each comprising, for example, several sensors) helps determine braking torque more accurately, albeit indirectly.

The person skilled in the art may make many changes and adaptations to the embodiments described above or may replace elements with others which are functionally equivalent to satisfy contingent needs without however departing from the scope of the appended claims. All the features described above as belonging to one possible embodiment may be implemented independently from the other described embodiments.

The invention claimed is:

1. A method for determining a braking torque resulting from actuation of a braking system for a vehicle, by a detection performed at at least one fixing interface between a brake caliper body and a brake caliper support, or between an axle and a wheel suspension, the method comprising:
   inserting at least one washer device at said at least one fixing interface, so that the at least one washer device is fixed and pressed between the brake caliper body and the brake caliper support or between the brake caliper support and a head of a clamping element, or between the axle and the wheel suspension,
   wherein said at least one washer device is subject to deformation when exposed to forces, so that a local deformation and/or strain (S) at each point of the at least one washer device is representative of the forces acting at said at least one fixing interface, dependent on the braking torque, and
   wherein said at least one washer device incorporates at least one deformation and/or strain sensor, at a respective detection position, arranged to detect a deformation and/or strain representative of spatial vector components of a force acting on the at least one washer device at the respective detection position, said at least one deformation and/or strain sensor being a fiber-optic strain sensor of fiber Bragg grating (FBG) type;
   detecting, by said at least one fiber-optic strain sensor, the local deformation and/or strain (S) acting in the respective detection position, and generating at least one respective photonic signal (L) representative of the detected local deformation and/or strain (S);
   receiving said at least one photonic signal (L), by an optical reading/interrogation unit, optically connected to said at least one fiber-optic strain sensor;
   generating, by the optical reading/interrogation unit, at least one electrical signal (E) representative of the detected local deformation and/or strain, on the basis of said at least one received photonic signal (L); and determining the braking torque on the basis of said at least one electrical signal (E) representative of the detected local deformation and/or strain (S), wherein the at least one fiber-optic strain sensor is comprised in an optical fiber arranged within a tangentially peripheral band of the at least one washer device, and each fiber-optic strain sensor is obtained in a respective optical fiber portion inclined with respect to a radial plane (p) of the at least one washer device at an acute or obtuse inclination angle different from 0°, 90°, 180° and 270°, to detect a strain (S) in a direction different from a normal direction and from a tangential direction, with respect to the at least one washer device, so that the detected strain (S) depends both on a normal component and on a tangential component of the force acting on the fiber-optic strain sensor.

2. The method of claim 1, wherein the inserting step comprises inserting a plurality of washer devices, each at a respective fixing interface, each washer device of said plurality of washer devices incorporating a plurality of fiber-optic fiber Bragg grating (FBG) strain sensors; and wherein the determining step comprises determining the braking torque on the basis of a plurality of electrical signals (Ejk), each electrical signal of said plurality of electrical signals deriving from a respective photonic signal (Ljk) representative of a respective local deformation and/or strain (Sij), detected by a respective fiber-optic strain sensor, wherein j is an index indicating one washer device of the plurality of washer devices and k is an index indicating one fiber-optic strain sensor of the plurality of fiber-optic strain sensors comprised in the washer device.

3. The method of claim 2, wherein the inserting step comprises:

inserting a first washer device at a first fixing interface between the head of a first fixing bolt and a first portion of the brake caliper support;

inserting a second washer device at a second fixing interface between the head of a second fixing bolt and a second portion of the brake caliper support;

inserting a third washer device at a third fixing interface between a third portion of the brake caliper support and the brake caliper body; and inserting a fourth washer device at a fourth fixing interface between a fourth portion of the brake caliper support and the brake caliper body.

4. The method of claim 2, wherein the inserting step comprises:

inserting a washer device at a fixing interface between a portion of the brake caliper support and the brake caliper body; and inserting a further washer device at a further fixing interface between a further portion of the brake caliper support and the brake caliper body.

5. The method of claim 2, wherein each fiber-optic strain sensor of said plurality of fiber-optic strain sensors of said washer device is made by a respective fiber Bragg grating (FBG), associated with a respective central operating wavelength ($\lambda 1$, $\lambda 2$, $\lambda 3$, $\lambda 4$, $\lambda 5$, $\lambda 6$); wherein the step of generating at least one respective photonic signal comprises generating a plurality of respective photonic signals (L1, L2, L3, L4, L5, L6);

the step of receiving at least one photonic signal (L) comprises receiving said plurality of respective photonic signals (L1, L2, L3, L4, L5, L6) by the optical reading/interrogation unit;

the step of generating, by the optical reading/interrogation unit, at least one electrical signal comprises generating a respective plurality of electrical signals (E1, E2, E3, E4, E5, E6), on the basis of said plurality of received respective photonic signals (L1, L2, L3, L4, L5, L6); and the step of determining comprises processing said plurality of electrical signals (E1, E2, E3, E4, E5, E6) to obtain a measurement of the braking torque.

6. The method of claim 5, further comprising:

transmitting, by the optical reading/interrogation element, through the first connection optical fiber, respective optical activation radiations (OA1, OA2, OA3, OA4, OA5, OA6) to said plurality of fiber-optic strain sensors, at different respective central operating wavelengths ($\lambda 1$, $\lambda 2$, $\lambda 3$, $\lambda 4$, $\lambda 5$, $\lambda 6$), by wavelength-division multiplexing (WDM) transmission techniques; and receiving, through the first connection optical fiber, and distinguishing respective optical spectra reflected by each fiber-optic strain sensor of said plurality of fiber-optic strain sensors, by wavelength-division multiplexing WDM transmission techniques, wherein each of said respective optical reflected spectra corresponds to a respective photonic signal (L1, L2, L3, L4, L5, L6).

7. The method of claim 1, further comprising:

incorporating at least one respective fiber-optic temperature sensor of fiber Bragg grating (FBG) type in the at least one washer device;

measuring, by said at least one respective fiber-optic temperature sensor, a temperature value (T) in the respective detection position and generating at least one respective auxiliary photonic signal (Lt) representative of the measured temperature value (T);

receiving said at least one respective auxiliary generated photonic signal (Lt), by the optical reading/interrogation unit, optically connected to said at least one respective fiber-optic temperature sensor; and generating, by the optical reading/interrogation unit, at least one auxiliary electrical signal (Et) representative of temperature, on the basis of said at least one received respective auxiliary photonic signal (Lt);

wherein the determining step comprises processing said at least one electrical signal (E) and at least one auxiliary electrical signal (Et) to obtain a measurement of the braking torque taking a temperature compensation into account, and wherein said at least one respective fiber-optic temperature sensor includes a fiber Bragg grating made in the same optical fiber in which the at least one fiber-optic strain sensor is made.

8. The method of claim 1, wherein said at least one fiber-optic strain sensor is connected to the optical reading/interrogation unit by a first connection optical fiber, wherein the optical reading/interrogation unit is configured to activate said at least one fiber-optic strain sensor by transmitting an optical activation radiation (OA) through said first connection optical fiber, and wherein said photonic signal (L) comprises an optical spectrum reflected by the at least one fiber-optic strain sensor, which reaches the optical reading/interrogation unit through said first connection optical fiber, or wherein the at least one fiber-optic strain sensor is connected to the optical reading/interrogation unit by a first input connection optical fiber and a second output connection optical fiber, wherein the optical reading/interrogation unit is configured to activate said at least one fiber-optic strain sensor by transmitting an optical activation radiation through said first input connection optical fiber, and wherein said at least one photonic signal (L) comprises an optical spectrum transmitted by the at least one fiber-optic strain sensor, which reaches the optical reading/optical fiber unit through the second output connection optical fiber.

9. The method of claim 1, comprising, before the determining step, transmitting to a control unit said at least one electrical signal (E) and/or at least one auxiliary electrical signal (Et);

wherein the determining step comprises:

calculating the braking torque, by a processor of the control unit by one or more algorithms executed by one or more software programs, on the basis of said at least one electrical signal (E) or on the basis of said at least one electrical signal (E) and said at least one auxiliary electrical signal (Et), or on the basis of said plurality of electrical signals (Ea, E1, E2, E3, E4, E5, E6; Eij) and of said at least one auxiliary electrical signal (Et);

wherein the calculating step comprises calculating the braking torque by of predefined non-linear relationships between the braking torque and the local deformation and/or strain detected by the at least one fiber-optic strain sensor in the respective detection position in which it is incorporated in the at least one washer device, said predefined non-linear relationships being represented by computerized models or look-up tables stored to be accessible by said processor of the control unit, and said predefined non-linear relations being determined by at least one of testing, characterization, and calibration phases performed after the at least one washer device containing the at least one deformation and/or strain sensor has been placed and fixed at a respective fixing interface between the brake caliper body and the brake caliper support.

10. The method of claim 9, wherein the inserting step comprises:

inserting a first washer device at a first fixing interface between the head of a first fixing bolt and a first portion of the brake caliper support;

inserting a second washer device at a second fixing interface between the head of a second fixing bolt and a second portion of the brake caliper support;

inserting a third washer device at a third fixing interface between a third portion of the brake caliper support and the brake caliper body; and inserting a fourth washer device at a fourth fixing interface between a fourth portion of the brake caliper support and the brake caliper body, and wherein the calculating step comprises:

defining, for each of the four washer devices a respective non-linear model adapted to determine three vector components of a respective tri-axial force, acting on a respective washer device; and calculating the braking torque based on tri-axial forces determined by the four non-linear models.

11. The method of claim 10, wherein said step of defining for each of the four washer devices a respective non-linear model comprises:

defining a basic non-linear model by a finite element method (FEM) simulation; and refining parameters of the non-linear model by an initial calibration phase, on the basis of measurements of strains (Sij) detected by respective fiber-optic strain sensors of the washer device and simultaneous measurements of physical quantities which generate said strains (Sij) under known experimental conditions, said physical quantities comprising the braking torque, a preload due to a tension of a fixing screw upon assembly and/or a pressure applied by the brake caliper.

12. The method of claim 1, wherein the determining step comprises obtaining a dynamic measurement of real time trend of the braking torque, on the basis of time evolution of the detected local deformation and/or strain.

13. A washer device for detecting deformation and/or strain, comprising:

a device body having shape of a washer or of a disc-shaped plate extending along a radial reference plane (p) and comprising a first flat face and a second flat face, parallel to the radial reference plane (p), adapted to be placed in close contact with surfaces of fixing means and/or of the brake caliper support, and/or of the brake caliper body, so as to be mounted at a fixing interface between the brake caliper body and brake caliper support, or between the brake caliper support and a head of a clamping element, wherein said device body further comprises a tangentially peripheral band and/or recess developing along a portion or perimeter of the device body of the washer device, wherein said device body is subject to deformation when exposed to forces, so that a local deformation and/or strain (S) in each point of the washer device is representative of the forces acting on the washer device;

an optical fiber arranged either along or at said tangentially peripheral band and/or recess, wherein said optical fiber comprises at least one deformation and/or strain sensor, wherein said at least one deformation and/or strain sensor is a fiber-optic strain sensor of fiber Bragg grating (FBG) type configured to detect the local deformation and/or strain (S) acting in a respective detection position, and generate at least one respective photonic signal (L) representative of the detected local deformation and/or strain (S), wherein each fiber-optic strain sensor is obtained in a respective portion of optical fiber inclined with respect to a radial plane (p) at an acute or obtuse inclination angle different from 0°, 90°, 180° and 270°, to detect a strain (S) in a direction different from a normal direction and from a tangential direction and from a tangential or radial direction, with respect to said reference plane (p) of the washer device, so that the detected strain (S) depends both on a normal component and a tangential component of a force acting on the fiber-optic strain sensor and/or on each of three orthogonal spatial vector component of the force acting on the fiber-optic strain sensor; and wherein the optical fiber comprising the at least one fiber-optic strain sensor is configured to transmit said at least one photonic signal (L) generated by the at least one fiber-optic strain sensor and to receive at least one optical activation radiation (OA) for at least one respective fiber-optic strain sensor.

14. The washer device of claim 13, wherein said inclination angle is ±30°.

15. The washer device of claim 13, wherein said optical fiber comprises a plurality of fiber-optic strain sensors arranged and/or equally spaced apart along the perimeter development of the optical fiber, each fiber-optic strain sensor of said plurality of fiber-optic strain sensors of a washer device being made by a respective fiber Bragg grating (FBG), associated with a respective central operating wavelength (λ1, λ2, λ3, λ4, λ5, λ6), and being adapted to be excited by a respective optical radiation at a respective central operating wavelength, belonging to a wavelength-division multiplexing (WDM) overall excitation optical radiation transmission, and to generate a transmitted or reflected optical spectrum which forms the respective photonic signal (L1, L2, L3, L4, L5, L6).

16. The device of claim 15, wherein said plurality of fiber-optic strain sensors comprises six fiber-optic strain sensors, or six fiber-optic strain sensors and one fiber-optic temperature sensor.

17. The washer device of claim 13, wherein geometry and material of the device body of the washer device are chosen to ensure mechanical strength to axial fixing preload and to a shearing force resulting from a braking action and optimize the deformation of the device body of the washer device without reaching critical structural strains,
wherein the device body of the washer device is made of one of steel, titanium, and aluminum,
wherein the device body of the washer device consists of various parts bound together and/or various parts mutually detachable and reattachable,
wherein the device body of the washer device comprises ellipsoidal section recesses along an annular recess at which the optical fiber is placed, and radial cavities having said ellipsoidal section recesses as external ends, and wherein a perimeter of the washer device has two opposite straight sides and two other opposite arc-of-circle-shaped sides.

18. The washer device of claim 13, wherein the first flat face and the second flat face of the device body have a surface alteration adapted to increase friction between said first and second flat faces and the surfaces of the fixing means and/or of the brake caliper support, and/or the brake caliper body), with which said first and second flat faces are respectively in contact, under operating conditions, in which they are mounted at fixing interface,
wherein said surface alteration of the first flat face and of the second flat face is obtained by:
mechanical finishing; or
texturing by laser technology; or
coating.

19. A sensorized brake caliper of a braking system for vehicle, comprising:
a brake caliper body;
a brake caliper support;
a first fixing bolt and a second fixing bolt; and
at least one washer device claim 13, the at least one washer device being fixed and pressed between the brake caliper body and the brake caliper support, corresponding to at least one fixing interface between the brake caliper body and the brake caliper support, wherein said brake caliper is a fixed caliper or a floating caliper.

20. The sensorized brake caliper of claim 19, further comprising:
an optical reading/interrogation unit, connectable to a remote control unit external to the brake caliper,
said optical reading/interrogation unit being optically connected to first photonic connection means to receive at least one photonic signal (L),
said optical reading/interrogation unit being configured to generate at least one electrical signal (E) representative of a detected local deformation and/or strain (S), on the basis of said at least one received photonic signal (L),
said at least one first electrical signal (E) being adapted to be transmitted to the remote control unit,
or wherein
the sensorized brake caliper comprises:
a first washer device at a first fixing interface between a head of the first fixing bolt and a first portion of the brake caliper support;
a second washer device at a second fixing interface between the head of the second fixing bolt and a second portion of the brake caliper support;
a third washer device at a third fixing interface between a third portion of the brake caliper support and the brake caliper body; and
a fourth washer device at a fourth fixing interface between a fourth portion of the brake caliper support and the brake caliper body.

21. A braking system for vehicle, comprising a plurality of sensorized brake calipers according to claim 19.

22. A system for determining a braking torque resulting from actuation of a braking system for vehicle, by a detection performed at at least one fixing interface between a brake caliper body and a brake caliper support, or between the brake caliper support and a head of a fixing bolt, or between an axle and a wheel suspension,
wherein the system comprises:
at least one washer device for detecting deformation and/or strain, comprising:
a device body having shape of a washer or of a disc-shaped plate extending along a radial reference plane (p) and comprising a first flat face and a second flat face, parallel to the radial reference plane (p), adapted to be placed in close contact with surfaces of fixing means and/or of the brake caliper support, and/or of the brake caliper body, so as to be mounted at a fixing interface between the brake caliper body and brake caliper support, or between the brake caliper support and the head of a clamping element,
wherein said device body further comprises a tangentially peripheral band and/or recess developing along a portion or perimeter of the device body of the washer device,
wherein said device body is subject to deformation when exposed to forces, so that a local deformation and/or strain (S) in each point of the washer device is representative of the forces acting on the washer device;
an optical fiber arranged either along or at said tangentially peripheral band and/or recess, wherein said optical fiber comprises at least one deformation and/or strain sensor, wherein said at least one deformation and/or strain sensor is a fiber-optic strain sensor of fiber Bragg grating (FBG) type configured to detect the local deformation and/or strain (S) acting in a respective detection position, and generate at least one respective photonic signal (L) representative of the detected local deformation and/or strain (S),
wherein each fiber-optic strain sensor is obtained in a respective portion of optical fiber inclined with respect to a radial plane (p) at an acute or obtuse inclination angle different from 0°, 90°, 180° and 270°, to detect a strain (S) in a direction different from a normal direction and from a tangential direction and from a tangential or radial direction, with respect to said reference plane (p) of the washer device, so that the detected strain (S) depends both on a normal component and a tangential component of a force acting on the fiber-optic strain sensor and/or on each of three orthogonal spatial vector component of the force acting on the fiber-optic strain sensor; and wherein the optical fiber comprising the at least one fiber-optic strain sensor is configured to transmit said at least one photonic signal (L) generated by the at least one fiber-optic strain sensor and to receive at least one optical activation radiation (OA) for at least one respective fiber-optic strain sensor, the at least one washer device being fixed and pressed between the brake caliper body and the brake caliper support or between the brake caliper support and the head of the clamping element, at said at least one fixing interface, or between the axle and the wheel suspension;

wherein the system further comprises:

an optical reading/interrogation unit, optically connected to the at least one washer device to receive said at least one photonic signal (L), said optical reading/interrogation unit being configured to generate at least one electrical signal (E) representative of the detected local deformation and/or strain (S), on the basis of said at least one received photonic signal (L); and a remote control unit connected to said optical reading/interrogation unit to receive said at least one electrical signal (E), said remote control unit being configured to process said at least one electrical signal (E) representative of the local deformation and/or strain (S) to obtain and provide a measurement of the braking torque.

23. The system of claim 22, comprising a plurality of washer devices, each at a respective fixing interface, wherein each washer device of said plurality of washer devices incorporates a plurality of fiber-optic strain sensors of fiber Bragg grating (FBG) type; and wherein the remote control unit is configured to determine the braking torque on the basis of a plurality of electrical signals (Ejk), each electrical signal deriving from a respective photonic signal (Ljk) representative of a respective local deformation and/or strain (Sij), detected by a respective fiber-optic strain sensor, wherein j is an index indicating one washer device of the plurality of washer devices and k is an index indicating one fiber-optic strain sensor of the plurality of fiber-optic strain sensors comprised in the washer device.

24. The system of claim 23, comprising:
a first washer device at a first fixing interface between the head of a first fixing bolt and a first portion of the brake caliper support;
a second washer device at a second fixing interface between the head of a second fixing bolt and a second portion of the brake caliper support;
a third washer device at a third fixing interface between a third portion of the brake caliper support and the brake caliper body; and
a fourth washer device at a fourth fixing interface between a fourth portion of the brake caliper support and the brake caliper body.

25. The system of claim 22, further comprising at least one respective fiber-optic temperature sensor of fiber Bragg grating type incorporated in the at least one washer device;
wherein said at least one temperature sensor is configured to measure a temperature value (T) in the respective detection position and to generate at least one respective auxiliary photonic signal (Lt) representative of the measured temperature value (T);

wherein the optical reading/interrogation unit is optically connected to said at least one respective fiber-optic temperature sensor and configured to receive said at least one generated respective auxiliary photonic signal (Lt), and to generate at least one auxiliary electrical signal (Et) representative of temperature, based on the at least one received respective auxiliary photonic signal (Lt);

and wherein the remote control unit is configured to process said at least one electrical signal (E) and said at least one auxiliary electrical signal (Et) to obtain a measurement of the braking force taking a temperature compensation into account, wherein said at least one respective fiber-optic temperature sensor comprises a fiber Bragg grating (FBG) made in the same optical fiber in which the at least one fiber-optic strain sensor is made.

26. The system of claim 22, wherein said at least one fiber-optic strain sensor is connected to the optical reading/interrogation unit by a first connection optical fiber, wherein the optical reading/interrogation unit is configured to activate said at least one fiber-optic strain sensor by transmitting an optical activation radiation (OA) through said first fiber-optic connection, and wherein said at least one photonic signal (L) comprises an optical spectrum reflected by the at least one fiber-optic strain sensor, which reaches the optical reading/interrogation unit through said first optical connection fiber;

or wherein the at least one fiber-optic strain sensor is connected to the optical reading/interrogation unit by a first input connection optical fiber and a second output connection optical fiber, wherein the optical reading/interrogation unit is configured to activate said at least one fiber-optic strain sensor by transmitting an optical activation radiation (OA) through said first input connection optical fiber, and wherein said at least one photonic signal (L) comprises an optical spectrum transmitted by the at least one fiber-optic strain sensor, which reaches the optical reading/interrogation unit through the second output connection optical fiber;

or wherein said optical fiber comprises a plurality of fiber-optic strain sensors arranged and/or equally spaced apart along a perimeter development of the optical fiber, and each fiber-optic strain sensor of said plurality of fiber-optic strain sensors of a washer device is made by f a respective fiber Bragg grating (FBG), associated with a respective central operating wavelength ($\lambda 1$, $\lambda 2$, $\lambda 3$, $\lambda 4$, $\lambda 5$, $\lambda 6$);

wherein each fiber-optic strain sensor is configured to generate at least one respective photonic signal of a plurality of photonic signals (L1, L2, L3, L4, L5, L6);

wherein the optical reading/interrogation unit is configured to receive said plurality of photonic signals (L1, L2, L3, L4, L5, L6), and to generate at least one respective electrical signal (E) of a plurality of electrical signals (E1, E2, E3, E4, E5, E6), on the basis of said plurality of received photonic signals (L1, L2, L3, L4, L5, L6);

and wherein the remote control unit is configured to process said plurality of electrical signals (E1, E2, E3, E4, E5, E6) to obtain a measurement of the braking torque;

or wherein the optical reading/interrogation unit is further configured for:

transmitting through the first connection optical fiber, respective optical activation radiations (OA1, OA2, OA3, OA4, OA5, OA6) to the plurality of fiber-optic strain sensors, at different respective central operating wavelengths (λ1, λ2, λ3, λ4, λ5, λ6), by wavelength-division multiplexing (WDM) transmission techniques; and receiving, through the first connection optical fiber, and distinguishing respective optical spectra reflected by each fiber-optic strain sensor of the plurality of fiber-optic strain sensors, by wavelength-division multiplexing (WDM) techniques, wherein each of said optical reflected spectra corresponds to a respective photonic signal (L1, L2, L3, L4, L5, L6).

27. The system of claim 22, wherein the control unit comprises a processor configured to calculate the braking torque by one or more algorithms executed by one or more software programs, on the basis of said at least one electrical signal (E) or on the basis of said at least one electrical signal (E) and said at least one auxiliary electrical signal (Et), or on the basis of said plurality of electrical signals (Ea, E1, E2, E3, E4, E5, E6; Eij) and of said at least one auxiliary electrical signal (Et).

28. The system of claim 22, wherein the optical reading/interrogation unit comprises:

a broadband optical radiation source, configured to transmit at least one first activation optical radiation (OA; OAa, OAb, OAc) and/or second activation optical radiation (OAt);

an opto-electronic spectrometer receiver, configured to select a wavelength and/or plurality of wavelengths to be received, and further configured to receive at least one first photonic signal (L; La, Lb, Lc) and convert it into at least one first electrical signal (E; Ea, Eb, Ec); and/or to receive said auxiliary photonic signal (Lt) and to convert it into said auxiliary electrical signal (Et);

or wherein the reading/interrogation unit comprises:

a tunable optical radiation source, configured to transmit said at least one first activation optical radiation (OA; OAa, OAb, OAc) and/or second activation optical radiation (OAt), each radiation being at a desired respective wavelength;

a photo-diode opto-electronic receiver, configured to receive the at least one first photonic signal (L; La, Lb, Lc) and convert it into said at least one first electrical signal (E; Ea, Eb, Ec); and/or to receive said auxiliary photonic signal (Lt) and to convert it into said auxiliary electrical signal (Et);

or wherein the optical reading/interrogation unit is entirely made by a single integrated circuit implemented in photonic integrated circuit (PIC) technology, and wherein said single PIC integrated circuit comprises:

a broadband optical radiation source, configured to transmit said at least one first activation optical radiation (OA; OAa, OAb, OAc) and/or second activation optical radiation (OAt);

at least one optical wavelength filtering element, tunable to the wavelength of an interrogated fiber Bragg grating (FBG), to select a respective photonic signal; and a photo-diode opto-electronic receiver, configured to receive the selected photonic signal from said at least one first photonic signal (L; La, Lb, Lc) and convert it into at least one first electrical signal (E; Ea, Eb, Ec); and/or to receive said auxiliary photonic signal (Lt), if selected, and to convert it into said auxiliary electrical signal (Et).

29. A braking system for vehicle comprising a system for determining a braking torque deriving from actuation of a vehicle braking system, according to claim 22.

30. A method for manufacturing a washer device for detecting deformation and/or strain, the washer device comprising:

a device body having shape of a washer or of a disc-shaped plate extending along a radial reference plane (p) and comprising a first flat face and a second flat face, parallel to the radial reference plane (p), adapted to be placed in close contact with surfaces of fixing means and/or of the brake caliper support, and/or of the brake caliper body, so as to be mounted at a fixing interface between the brake caliper body and brake caliper support, or between the brake caliper support and a head of a clamping element, wherein said device body further comprises a tangentially peripheral band and/or recess developing along a portion or perimeter of the device body of the washer device, wherein said device body is subject to deformation when exposed to forces, so that a local deformation and/or strain (S) in each point of the washer device is representative of the forces acting on the washer device;

an optical fiber arranged either along or at said tangentially peripheral band and/or recess, wherein said optical fiber comprises at least one deformation and/or strain sensor, wherein said at least one deformation and/or strain sensor is a fiber-optic strain sensor of fiber Bragg grating (FBG) type configured to detect the local deformation and/or strain (S) acting in a respective detection position, and generate at least one respective photonic signal (L) representative of the detected local deformation and/or strain (S), wherein each fiber-optic strain sensor is obtained in a respective portion of optical fiber inclined with respect to a radial plane (p) at an acute or obtuse inclination angle different from 0°, 90°, 180° and 270°, to detect a strain (S) in a direction different from a normal direction and from a tangential direction and from a tangential or radial direction, with respect to said reference plane (p) of the washer device, so that the detected strain (S) depends both on a normal component and a tangential component of a force acting on the fiber-optic strain sensor and/or on each spatial vector component of the force acting on the fiber-optic strain sensor; and wherein the optical fiber comprises the at least one fiber-optic strain sensor is configured to transmit said at least one photonic signal (L) generated by the at least one fiber-optic strain sensor and to receive at least one optical activation radiation (OA) for at least one respective fiber-optic strain sensor, wherein the method comprises:

positioning on a side surface of a washer of the washer device an optical fiber previously prepared by inscribing the at least one fiber-optic strain sensor arranged according to a pre-determined spacing;

positioning each portion of fiber inscribed with a respective fiber-optic strain sensor in a respective inclined direction, at a predetermined inclination angle with respect to a radial reference plane (p) of the washer, along the side surface of the washer;

fixing a shaped box to the washer and to said optical fiber to protect and orient outgoing fiber;

fixing the optical fiber and its inclined fiber portions comprising the at least one fiber-optic strain sensors on a side band of the washer and in the output box with binder material; and applying a protective layer around a peripheral side band of the washer in which the optical fiber is arranged.

31. The method of claim 30, further comprising:

modifying the first flat face and the second flat face of the body of the washer device by a surface alteration adapted to increase friction between said first and second flat faces and the surfaces of the fixing means and or of the brake caliper support, and/or the brake caliper body, with which said first and second flat faces are respectively in contact, under operating conditions in which they are mounted at one fixing interface, wherein said surface alteration of the first flat face and of the second flat face is obtained by:

mechanical finishing; or texturing by laser technology; or coating.

* * * * *